US006693852B2

(12) United States Patent
Koike et al.
(10) Patent No.: US 6,693,852 B2
(45) Date of Patent: Feb. 17, 2004

(54) ELECTRONIC DEVICE, ELECTRONICALLY-CONTROLLED MECHANICAL TIMEPIECE, AND ELECTRONIC DEVICE CONTROLLING METHOD

(75) Inventors: Kunio Koike, Suwa (JP); Eisaku Shimizu, Suwa (JP); Hidenori Nakamura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/104,935

(22) Filed: Mar. 22, 2002

(65) Prior Publication Data

US 2002/0141528 A1 Oct. 3, 2002

(30) Foreign Application Priority Data

Mar. 29, 2001 (JP) ....................................... 2001-096070

(51) Int. Cl.[7] .............................. G04C 3/00; H02P 9/00

(52) U.S. Cl. ......................... 368/204; 368/203; 368/64; 368/66; 322/8; 322/24; 322/29; 322/46

(58) Field of Search ................................ 368/203–204, 368/64, 66; 322/8, 24, 29, 46

(56) References Cited

U.S. PATENT DOCUMENTS 4,284,936 A * 8/1981 Bailey et al. ............... 318/381
4,361,409 A * 11/1982 Sutter .......................... 368/80
4,682,092 A * 7/1987 Pellegrino et al. .......... 318/696
5,208,741 A * 5/1993 Kumar ....................... 363/124
6,041,021 A * 3/2000 Shinkawa et al. ............ 368/64
6,097,675 A * 8/2000 Takahashi et al. .......... 368/204
6,252,828 B1 * 6/2001 Shinkawa et al. .......... 368/203
6,373,789 B2 * 4/2002 Koike et al. ................ 368/204
6,477,116 B1 * 11/2002 Shinkawa et al. .......... 368/157
6,483,276 B1 * 11/2002 Shimizu et al. ............... 322/24

* cited by examiner

*Primary Examiner*—David Martin
*Assistant Examiner*—Michael L. Lindinger
(74) *Attorney, Agent, or Firm*—Michael T. Gabrik

(57) ABSTRACT

An electronic device in which a braking torque can be increased while reduction in power generation is suppressed, and in which a rotor is prevented from stopping or rotating at an excessive speed. Such an electronic device includes a generator which is driven by an mechanical energy source and a rotation controller which controls the rotational period of the generator. The rotation controller includes two switches which connect both terminals of the generator in the form of a closed loop, a chopping signal generator which generates a chopping signal that is applied to the switches, and a brake control circuit which performs chopper control of the generator by selectively switching between three brake control modes including a high-power brake control mode in which the effective braking force generated by applying the chopping signal is relatively large a low-power brake control mode in which the effective braking force is relatively small, and a mid-power brake control mode in which the effective braking force is between that of the high- and low-power brake control modes.

15 Claims, 16 Drawing Sheets

ELECTRONIC DEVICE, ELECTRONICALLY-CONTROLLED MECHANICAL TIMEPIECE, AND ELECTRONIC DEVICE CONTROLLING METHOD

BACKGROUND OF THE INVENTION

1. Field of the Invention

The present invention relates to an electronic device, an electronically-controlled, mechanical timepiece, and an electronic device controlling method. More specifically, the present invention relates to such a device/timepiece which includes a mechanical energy source, a generator which is driven by the mechanical energy source and which generates induced electrical power and provides electrical energy, and a rotation controller which is driven by the electrical energy and which controls the rotation period of the generator. A method for so controlling an electronic device is also provided.

2. Description of the Related Art

Japanese Patent Publication No. 7-119812 discloses an electronically controlled, mechanical timepiece which presents precise time by accurately driving hands attached to a gear train. In this timepiece, a mainspring, when unwound, releases mechanical energy, which is converted into electrical energy by a generator. The electrical energy is then used to drive a rotation controller, which controls the current flowing through a coil of the generator.

In order to increase the duration of such an electronically-controlled, mechanical timepiece, it is important that, while a torque of the mainspring (mainspring torque) is high, a braking torque can be increased without reducing the power generated. More specifically, in the brake control of the generator, preferably, the braking torque is prioritized when the mainspring torque is high and power generation (electromotive force) is prioritized when the mainspring torque is low, that is, when a large braking force is not required. The torque (mainspring torque) is increased not only when the mainspring is wound by a large amount but also when a driving torque applied to a rotor is increased due to external shock such as oscillation, impact, etc. Similarly, the torque (mainspring torque) is increased not only when the mainspring is loose but also when the driving torque applied to the rotor is reduced due to the external shock.

Thus, according to the Japanese Patent Publication No. 7-119812, two angular ranges are provided in a single turn of a rotor, that is, in each period of a reference signal. In one angular range, a braking force is removed to increase the rotational speed of the rotor so that the amount of power generation is increased. In the other angular range, a braking force is applied to reduce the rotational speed of the rotor. The efficiency in power generation is increased while the rotor rotates at a high speed to compensate for a drop in power generation that takes place during the braking period.

More specifically, according to the Japanese Patent Publication No. 7-119812, the braking force is removed at first time points which occur periodically at the same period as a reference signal obtained from a crystal oscillator, etc. In addition, the braking force is re-applied at second time points, which occur alternately with the first time points with the same period as the reference signal. Accordingly, the braking force is removed and re-applied in every period of the reference signal. However, according to the Japanese Patent Publication No. 7-119812, power generation is reduced while the braking force is applied, so that there is a limit to the amount by which the braking torque can be increased while the reduction in power generation is suppressed.

In addition, according to the Japanese Patent Publication No. 7-119812, the braking force is simply applied or removed. Thus, the rotational speed of the rotor is suddenly reduced when the braking force is applied and is suddenly increased when the braking force is removed. A problem with this arrangement is that the sudden changes in the rotational speed of the rotor cause the hands connected to the rotor vibrate at a large amplitude. In addition, since the braking force is simply applied or removed, an excessive braking force may be applied even when only a small braking force is required, and the braking force may be reduced too much even when only a small reduction is required.

Especially when an excessive braking force is applied, the possibility that the rotor will stop due to a cogging torque of the rotor increases. For example, according to experiments performed by the inventors, if a generator of an electronically-controlled, mechanical timepiece is controlled to rotate at 8 Hz, the possibility that a rotor will stop due to the cogging torque increases when the rotational speed is reduced to 5 Hz by the braking force.

In contrast, when the braking force is reduced too much, there is a problem in that the rotational speed of the rotor is excessively increased.

These problems occur not only in electronically-controlled, mechanical timepieces, but also in various electronic devices such as music boxes, metronomes, etc., which include components rotated by a mechanical energy source such as a mainspring, an elastic band, etc. Thus, solving these problems would improve these timepieces and electronic devices.

OBJECTS OF THE INVENTION

An object of the present invention is to provide an electronically-controlled mechanical timepiece, an electronic device and a method for controlling such a device, which overcome these problems.

It is another object of this invention to provide such a timepiece, device and controlling method in which the braking torque can be increased while the reduction in power generation is suppressed, in which the variation in rotational speed of the rotor of the generator can be reduced, and in which the rotational speed of the rotor can be reliably controlled while preventing the rotor from stopping or rotating at an excessive speed.

SUMMARY OF THE INVENTION

According to one aspect of the present invention, an electronic device is provided. Such a device comprises a mechanical energy source; a generator configured to be driven by the mechanical energy source, to generate induced electrical power, and to provide electrical energy; and a rotation controller configured to be driven by the electrical energy, and to control the rotation period of the generator. The rotation controller includes a switch that is able to selectively connect both terminals of the generator in the form of a closed loop, a chopping signal generator configured to generate a chopping signal that is applied to the switch for brake control of the generator, and a brake controller configured to control the chopping signal generator, and thereby control a braking force applied to the generator, by switching between at least three brake control modes, including a high-power brake control mode in which an effective braking force is large, a mid-power brake control mode in which the effective braking force is less than the effective braking force of the high-power brake control mode, and a low-power brake control mode in which the effective braking force is less than the effective braking force of the mid-power brake control mode.

In the electronic device of the present invention, the generator is driven by the mechanical energy source, which may be a mainspring or equivalent component, and the rotational speed of a rotor in the generator is controlled by applying a braking force to the generator, as determined by the rotation controller.

The rotation of the generator is controlled by applying the chopping signal to the switch, that is, by turning on and off the switch, which selectively connects both terminals of a coil of the generator in the form of a closed loop. When the switch is turned on, both terminals of the generator coil are connected in the form of a closed loop so that a short brake is applied and energy is stored in the coil of the generator. When the switch is turned off and the loop is opened, the generator is activated. Because of the additional energy stored in the coil, the electromotive force (generated voltage) of the generator is increased. Since the brake control is performed based on the chopping signal, in the case in which a large braking force is applied, the reduction in power generation can be compensated for by the increase of electromotive force during the time in which the switch is turned off. Accordingly, the braking force (braking torque) can be increased while the reduction of power generation is suppressed to provide an electronic device having a long duration.

Further, by employing at least three braking modes, situations where an excessive braking force is applied when only a small braking force is required or where a braking force is reduced too much when only a small reduction is required can be avoided. Thus, the generator is prevented from stopping because of an excessive braking force and is also prevented from rotating at a speed higher than the reference speed because of excessive reduction of the braking force. Accordingly, the rotational speed of the generator can be maintained relatively constant.

The closed loop state is one in which the braking force applied to the generator is relatively increased. Thus, a circuit including, for example, a resistance element between the switch and the generator may also be regarded as a closed loop. However, the terminals of the generator are preferably directly shorted since the potentials at the terminals of the generator can be easily made the same and the short brake can be effectively applied. The chopping signal obtained from the chopping signal generator may be directly input to the switch or be input to the switch via other circuits or elements.

Preferably, the chopping signal generator is able to generate at least three chopping signals, each having a different duty factor or different frequency than the others, to generate different effective braking forces depending on which chopping signal is applied to the switch, and the brake controller includes a chopping signal selector which selects one of the at least three chopping signals to be applied to the switch.

The effective braking force can also be changed by attaching a variable resistor to the coil circuit to which the chopping signal is applied and changing the resistance of the coil. However, when the effective braking force is changed using at least tree chopping signals, each of which differ in at least one of the duty factor and the frequency, as described above, the circuit construction can be simplified and the rotation control can be more easily performed. In addition, the short brake can be more effectively applied.

As described above, the chopper control of the generator is performed by providing the switch that is able to connect both terminals of the generator in the form of a closed loop and applying the chopping signal to the switch. In such a case, the driving torque (braking torque) increases as the chopping frequency is reduced, and as the duty factor is increased. In addition, the charging voltage (generated voltage), that is, the electromotive force, increases as the chopping frequency is increased, but decreases only by a small amount even when the duty factor is increased. When the frequency is 50 Hz or more, the charging voltage increases until the duty factor reaches 0.8. Thus, the chopping signals for the high-power brake control, the mid-power brake control, and the low-power brake control can be determined in consideration of the above-described characteristics.

Also, according to the present invention, the mid-power brake control may be advantageously performed in a transitional period between which the low- and high-power brake control modes are performed. That is, before switching from the low- to the high-power braking mode or vice versa, mid-power brake control is performed.

By not suddenly switching from the low-power brake control mode to the high-power brake control mode but instead first switching to the mid-power brake control mode and then to the high-power brake control mode, the risk of generating excessive braking force causing the rotor of the generator to stop can be prevented. In the generator, the problem of the rotor stopping is more critical than the problem of the rotor rotating at an excessive speed. Thus, the rotational speed of the generator can be more reliably controlled by performing the mid-power brake control before the high-power brake control.

By not suddenly switching from the high-power brake control mode to the low-power brake control mode but instead first switching to the mid-power brake control mode and then to the low-power brake control mode, excessive reduction of the braking force can be more reliably prevented. Accordingly, the situation such that the phase of the rotor exceeds that of the reference signal and the rotor rotates at an excessive speed can be prevented and the rotational speed of the generator can be reliably controlled.

Most preferably, the mid-power brake control is performed in a transitional period during which the low-power brake control is switched to the high-power brake control and also in a transitional period during which the high-power brake control is switched to the low-power brake control. By performing the mid-power brake control in both of the above-described transitional periods, over increase and over reduction of the braking force can be prevented. Thus, the rotor can be prevented from stopping and the rotational speed of the rotor can be more reliably maintained constant.

According to another aspect of the present invention, an electronic device comprises a mechanical energy source; a generator configured to be driven by the mechanical energy source, to generate induced electrical power, and to provide electrical energy; and a rotation controller configured to be driven by the electrical energy, and to control the rotation period of the generator. The rotation controller includes a switch which is able to selectively connect both terminals of the generator in the form of a closed loop, a chopping signal generator configured to generate a chopping signal that is applied to the switch for brake control of the generator, and a brake controller configured to control the chopping signal generator, and thereby control a braking force applied to the generator, by selectively switching between a high-power brake control mode in which an effective braking force is gradually increased and a low-power brake control mode in which the effective braking force is gradually reduced.

Since the effective braking force is gradually changed in each of the high- and low-power brake control modes, the braking force applied to the generator does not suddenly change by a large amount. Thus, the rotational speed of the rotor can be gradually changed and the reliability of the rotation control can be improved. As a result, the rotational speed can be maintained constant while the generator is prevented from stopping because of an excessive braking force or rotating at a speed higher than the reference speed because of excessive reduction of the braking force.

In addition, since the brake control is performed based on the chopping signal, the reduction in power generation can be compensated for by the increase of electromotive force during the time in which the switch is turned off. Accordingly, the braking force (braking torque) can be increased while the reduction of power generation is suppressed to provide an electronic device having a long duration.

Preferably, the chopping signal generator is able to generate a plurality of chopping signals, each having a different duty factor or different frequency than the others, to generate different effective braking forces depending on which chopping signal is applied to the switch, and the brake controller includes a chopping signal selector which sequentially selects one of the chopping signals to be applied to the switch.

When the effective braking force is changed using a plurality of chopping signals, each differing in at least one of the duty factor and the frequency, the circuit construction can be simplified and the rotation control can be more easily performed, as compared to the case in which the effective braking force is changed by changing a circuit resistance. In addition, the short brake can be more effectively applied.

Preferably, when the low-power brake control mode is switched to the high-power brake control mode, the effective braking force is gradually increased from a predetermined value to avoid a sudden and large increase in the applied braking force. Accordingly, the rotor of the generator can be reliably prevented from stopping because of an excessive braking force.

In addition, preferably, when the high-power brake control mode is switched to the low-power brake control mode, the effective braking force is gradually reduced from a predetermined value to avoid a sudden and large decrease in the applied braking force. Accordingly, the rotor of the generator can be prevented from rotating at a high speed because of excessive reduction of the braking force and the rotational speed of the generator can be reliably controlled.

The braking forces applied at the start of the high-power brake control and at the start of the low-power brake control, respectively, may be determined in accordance with the application. For example, the predetermined braking force may be fixed in advance to a value between a maximum effective braking force and a minimum effective braking force. More specifically, in the case in which the effective braking force is changed by switching the duty factor of the chopping signal in fifteen steps in the range of $1/16$ to $15/16$, the duty factor of $7/16$ or $8/16$ may be used as the duty factor at the start of the high- or low-power brake control. Then, when the high-power brake control is continuously performed, the duty factor is gradually increased so that the effective braking force is also gradually increased. On the other hand, when the low-power brake control is continuously performed, the duty factor is gradually reduced from that starting factor so that the effective braking force is also gradually reduced.

When the effective braking force applied at the start of the high-power brake control mode and the low-power brake control mode is set to a fixed value in advance, the braking force applied to the generator can be predicted in advance, thus simplifying the brake control method and a program for implementing it. The predetermined value may be determined on the basis of the effective braking force which is applied immediately before the brake control mode is switched. More specifically, when the high-power brake control mode is switched to the low-power brake control mode, an effective braking force that is less than that applied at the end of the high-power brake control mode may be applied at the start of the low-power brake control mode. Then, when the low-power brake control mode is continuously performed, the effective braking force may be gradually reduced. Similarly, when the low-power brake control mode is switched to the high-power brake control mode, an effective braking force that is greater than that applied at the end of the low-power brake control mode may be applied at the start of the high-power brake control mode. Then, when the high-power brake control mode is continuously performed, the effective braking force may be gradually increased. Accordingly, the change in the effective braking force when the brake control mode is switched between the high- and the low-power brake control modes can be reduced, and the rotational speed of the rotor can be more smoothly changed.

According to another aspect of the present invention, an electronic device comprises a mechanical energy source; a generator configured to be driven by the mechanical energy source, to generate induced electrical power, and to provide electrical energy; and a rotation controller configured to be driven by the electrical energy, and to control the rotation period of the generator. The rotation controller includes a switch which is able to selectively connect both terminals of the generator in the form of a closed loop, a chopping signal generator configured to generate a chopping signal that is applied to the switch for brake control of the generator, and a brake controller configured to control the chopping signal generator, and thereby control a braking force applied to the generator, by selectively switching between at least two brake control modes, including a high-power brake control mode in which an effective braking force is large and a low-power brake control mode in which the effective braking force is less than the effective braking force of the high-power brake control mode, and which gradually changes the braking force in at least one of the high-power brake control mode and the low-power brake control mode.

As described above, the effective braking force is gradually changed in at least one of the high- and low-power brake control modes. Thus, the braking force applied to the generator does not suddenly change by a large amount, as in the case in which a substantial braking force is simply applied or removed all at once. Thus, the rotational speed of the rotor can be gradually changed and the reliability of the rotation control can be improved. As a result, the generator can be prevented from stopping because of an excessive braking force or rotating at a speed higher than the reference speed because of excessive reduction of the braking force.

In addition, since the brake control is performed based on the chopping signal, the reduction in power generation can be compensated for by the increase of electromotive force during the time in which the switch is turned off. Accordingly, the braking force (braking torque) can be increased while the reduction of power generation is suppressed to provide an electronic device having a long duration.

Preferably, when the braking force is gradually changed, the braking force starts at a predetermined value. When the effective braking forces applied at the start of the high- and low-power brake control modes are respectively set to predetermined values in advance, the braking force applied to the generator can be predicted in advance. Thus, a program, etc., for the brake control can be made simpler.

According to another aspect of the present invention, an electronically-controlled, mechanical timepiece comprises a mechanical energy source; a generator configured to be driven by the mechanical energy source, to generate induced electrical power and to provide electrical energy; a time display configured to be operated in association with the rotation of the generator; and a rotation controller configured to be driven by the electrical energy, and to control the rotation period of the generator. The rotation controller includes a switch which is able to selectively connect both terminals of the generator in the form of a closed loop, a chopping signal generator configured to generate a chopping signal that is applied to the switch for a brake control of the generator, and a brake controller configured to control the chopping signal generator, and thereby control a braking force applied to the generator, by switching between at least three brake control modes, including a high-power brake control mode in which an effective braking force is large, a mid-power brake control mode in which the effective braking force is less than the effective braking force of the high-power brake control mode, and a low-power brake control mode in which the effective braking force is less than the effective braking force of the mid-power brake control mode.

According to another aspect of the present invention, an electronically-controlled, mechanical timepiece comprises a mechanical energy source; a generator configured to be driven by the mechanical energy source, to generate induced electrical power, and to provide electrical energy; a time display configured to be operated in association with the rotation of the generator; and a rotation controller configured to be driven by the electrical energy, and to control the rotation period of the generator. The rotation controller includes a switch which is able to selectively connect both terminals of the generator in the form of a closed loop, a chopping signal generator configured to generate a chopping signal that is applied to the switch for a brake control of the generator, and a brake controller configured to control the chopping signal generator, and thereby control a braking force applied to the generator, by switching between a high-power brake control mode in which an effective braking force is gradually increased and a low-power brake control mode in which the effective braking force is gradually reduced.

According to another aspect of the present invention, an electronically-controlled, mechanical timepiece comprises a mechanical energy source; a generator configured to be driven by the mechanical energy source, to generate induced electrical power, and to provide electrical energy; a time display configured to be operated in association with the rotation of the generator; and a rotation controller configured to be driven by the electrical energy, and to control the rotation period of the generator. The rotation controller includes a switch which is able to selectively connect both terminals of the generator in the form of a closed loop, a chopping signal generator configured to generate a chopping signal that is applied to the switch for a brake control of the generator, and a brake controller configured to control the chopping signal generator, and thereby control a braking force applied to the generator, by switching between at least two brake control modes, including a high-power brake control mode in which an effective braking force is large and a low-power brake control mode in which the effective braking force is less than the effective braking force of the high-power brake control mode, and to gradually change the effective braking force in at least one of the high-power brake control mode and the low-power brake control mode.

In the electronically-controlled, mechanical timepiece of the present invention, the rotational speed can be maintained constant while the generator is prevented from stopping because of an excessive braking force and is also prevented from rotating at a speed higher than the reference speed because of excessive reduction of the braking force. Thus, rotation control can be reliably performed. Moreover, since the rotor can be steadily moved, vibration of hands that are moved in association with the rotor can be suppressed. Accordingly, a high quality electronically-controlled, mechanical timepiece can be provided.

According to another aspect of the present invention, a method for controlling an electronic device is provided. The device includes a mechanical energy source; a generator configured to be driven by the mechanical energy source, to generate induced electrical power, and to provide electrical energy; and a rotation controller configured to be driven by the electrical energy and to control the rotation period of the generator. The method comprises the steps of applying a chopping signal to a switch which is able to selectively connect both terminals of the generator in the form of a loop; and controlling the applying of the chopping signal, and thereby controlling a braking force applied to the generator, by switching between at least three brake control modes, including a high-power brake control mode in which an effective braking force is large, a mid-power brake control mode in which the effective braking force is less than that of the high-power brake control mode, and a low-power brake control mode in which the effective braking force is less than that of the mid-power brake control mode.

According to another aspect of the present invention, a method for controlling an electronic device is provided. The device includes a mechanical energy source; a generator configured to be driven by the mechanical energy source, to generate induced electrical power, and to provide electrical energy; and a rotation controller configured to be driven by the electrical energy and to control the rotation period of the generator. The method comprises the steps of applying a chopping signal to a switch which is able to selectively connect both terminals of the generator in the form of a loop; and controlling the applying of the chopping signal, and thereby controlling a braking force applied to the generator, by switching between a high-power brake control mode in which an effective braking force is gradually increased and a low-power brake control mode in which the effective braking force is gradually reduced.

According to another aspect of the present invention, a method for controlling an electronic device is provided. The device includes a mechanical energy source; a generator configured to be driven by the mechanical energy source, to generate induced electrical power, and to provide electrical energy; and a rotation controller configured to be driven by the electrical energy and to control the rotation period of the generator. The method comprises the steps of applying a chopping signal to a switch which is able to selectively connect both terminals of the generator in the form of a loop; and controlling the applying of the chopping signal, and thereby controlling a braking force applied to the generator, by switching between at least two brake control modes, including a high-power brake control mode in which an effective braking force is large and a low-power brake control mode in which the effective braking force is less than that of the high-power brake control mode; and gradually changing the braking force in at least one of the high-power brake control mode and the low-power brake control mode.

According to the above-described control methods, the rotational speed can be maintained constant while the generator is prevented from stopping because of an excessive braking force and is also prevented from rotating at a speed higher than the reference speed because of excessive reduction of the braking force. Thus, rotation control can be more reliably performed.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Embodiments of the present invention will be described below with reference to the accompanying drawings.

Figure 1:
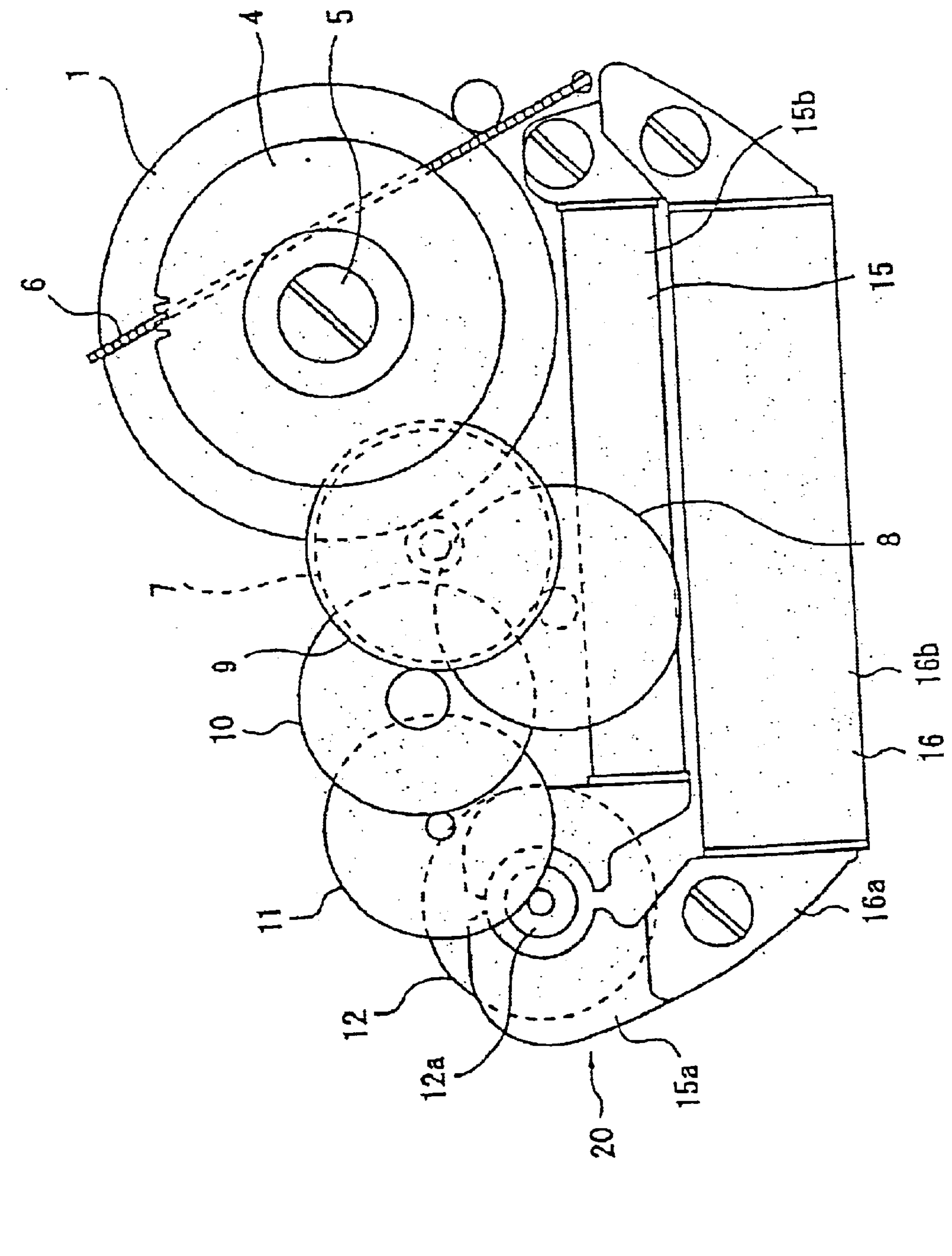
FIG. 1 is a plan view of a portion of an electronically-controlled, mechanical timepiece according to a first embodiment of the present invention.
Figure 2:
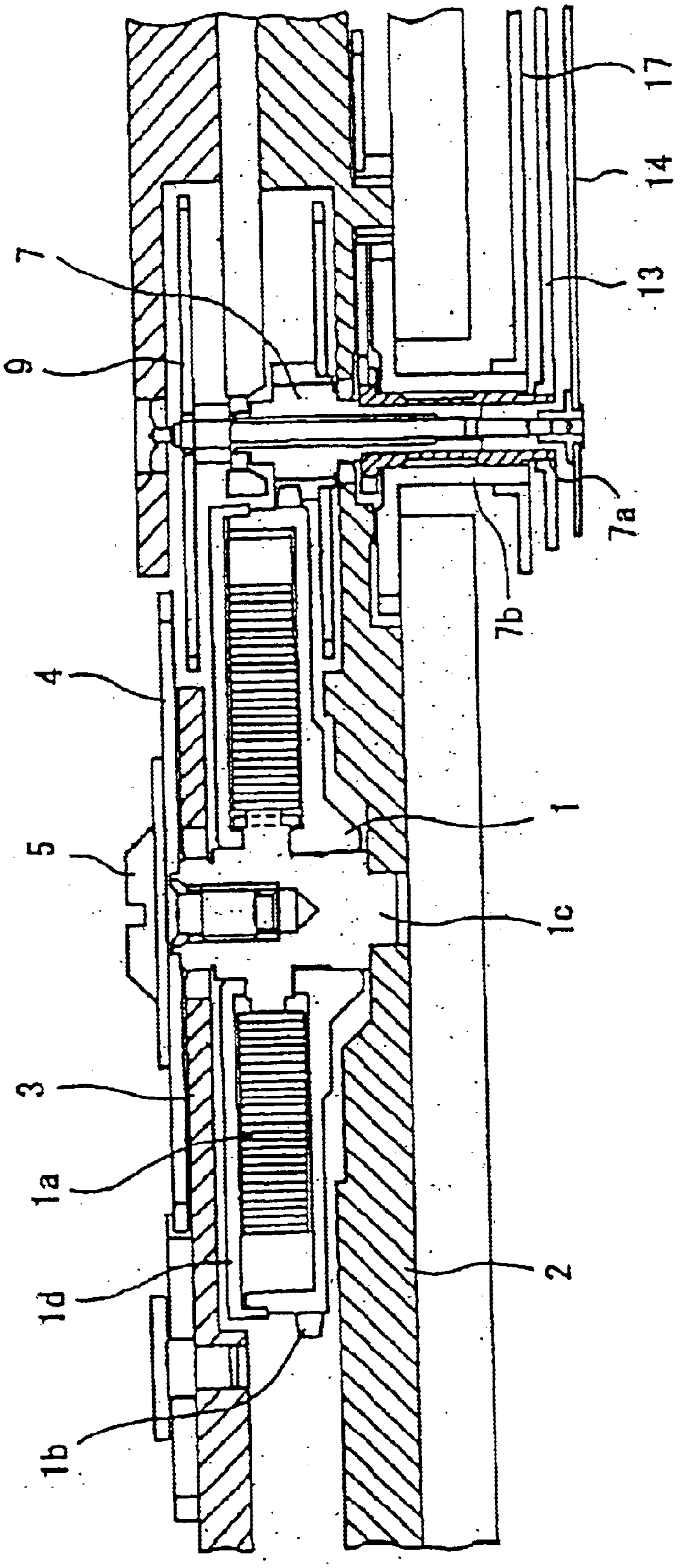
FIG. 2 is a sectional view of a portion of the timepiece in FIG. 1.
Figure 3:
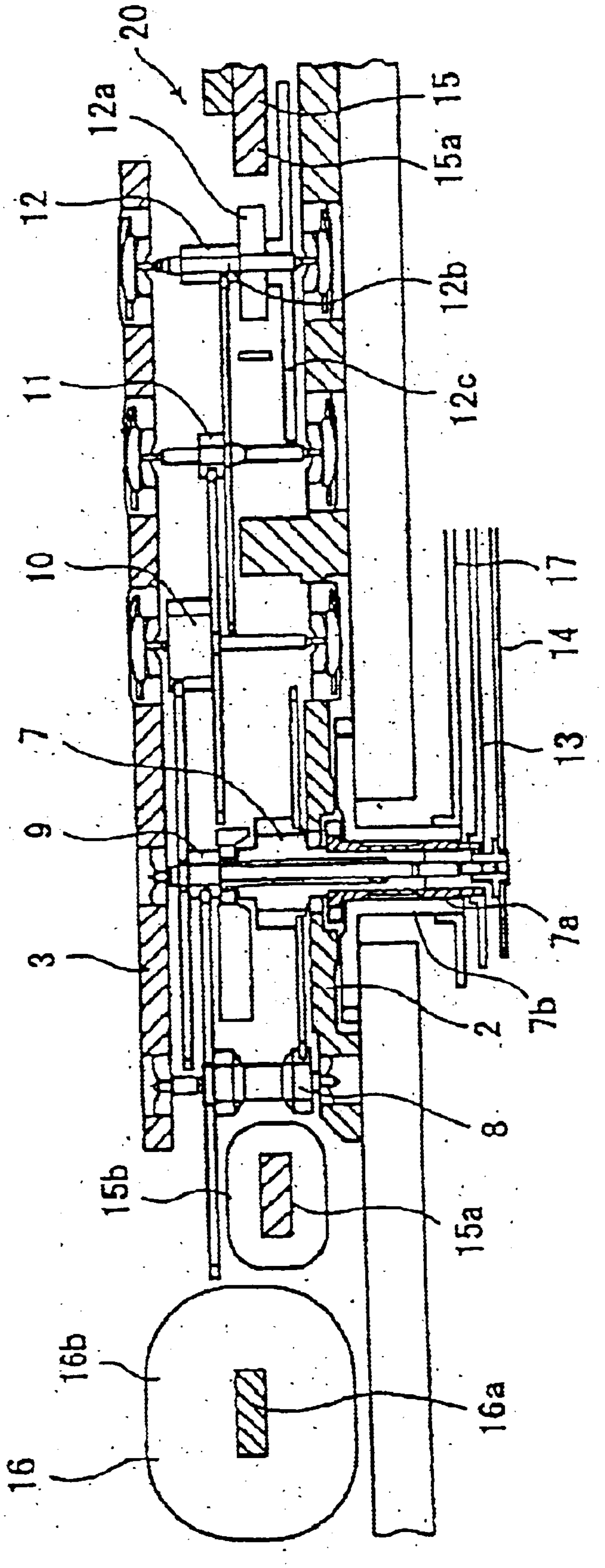
FIG. 3 is a sectional view of another portion of the timepiece in FIG. 1.

FIG. 1 is a plan view of an electronically-controlled, mechanical timepiece, which is an electronic device according to a first embodiment of the present invention, and FIGS. 2 and 3 are sectional views of FIG. 1.

The electronically-controlled, mechanical timepiece includes a movement barrel 1 which is constructed of a mainspring 1*a*, a barrel wheel 1*b*, a barrel arbor 1*c*, and a barrel cover 1*d*. The mainspring 1*a*, which serves as a mechanical energy source, is fixed to the barrel gear 1*b* at the outer end thereof and is fixed to the barrel arbor 1*c* at the inner end thereof. The barrel arbor 1*c* is supported by a main plate 2 and a gear train supporter 3, and is fixed to a ratchet wheel 4 by a ratchet wheel screw 5 so that the barrel arbor 1*c* and the ratchet wheel 4 rotate together.

The ratchet wheel 4 meshes with a recoil click 6 so that the ratchet wheel 4 can rotate only in the clockwise direction and not in the counterclockwise direction. The ratchet wheel 4 is rotated clockwise to tighten the mainspring 1*a* in a manner similar to a typical self-winding or manual-winding mechanical timepiece, and explanations thereof are thus omitted.

The rotation of the barrel gear 1*b* is transmitted to a second wheel 7 as the speed thereof is increased by seven times, and thereafter sequentially transmitted to a third wheel 8 as the speed is increased by 6.4 times, to a fourth wheel 9 as the speed is increased by 9.375 times, to a fifth wheel 10 as the speed is tripled, to a sixth wheel 11 as the speed is increased by ten times, and to a rotor 12 as the speed is increased by ten times. In total, the rotational speed of the barrel gear 1*b* is increased by 126,000 times. Accordingly, a mechanical energy transmitting device, which transmits a mechanical energy obtained from the mainspring 1*a* to a generator 20, is constructed of a speed-increasing gear train including the wheels 7 to 11.

A cannon pinion 7*a* is fixed to the second wheel 7, and a minute hand 13 is fixed to the cannon pinion 7*a*. In addition, a second hand 14 is fixed to the fourth wheel 9, and an hour hand 17 is fixed to an hour wheel 7*b*. Accordingly, in order to rotate the second wheel 7 at 1 rph and the fourth wheel 9 at 1 rpm, the rotor 12 should be rotated at 8 rps. In such a case, the barrel gear 1*b* rotates at 1/7 rph. A time display is constructed of the hands 13, 14, and 17.

The generator 20 of the electronically-controlled, mechanical timepiece includes the rotor 12, a stator 15, and a coil block 16. The rotor 12 is constructed of a rotor magnet 12*a*, a rotor pinion 12*b*, and a rotor flywheel 12*c*. The rotor flywheel 12*c* is used for reducing variation in the rotational speed of the rotor 12, which occurs due to variation in the driving torque of the movement barrel 1. The stator 15 includes a stator body 15*a* and a stator coil 15*b* which is wound around the stator body 15*a* for 40,000 turns.

The coil block 16 includes a coil core 16*a* and a coil 16*b* which is wound around the coil core 16*a* for 110,000 turns. The stator body 15*a* and the coil core 16*a* are constructed of, for example, PC Permalloy, and the stator coil 15*b* and the coil 16*b* are connected in series so that the sum of the voltages across the stator coil 15*b* and the coil 16*b* is output.

Figure 4:
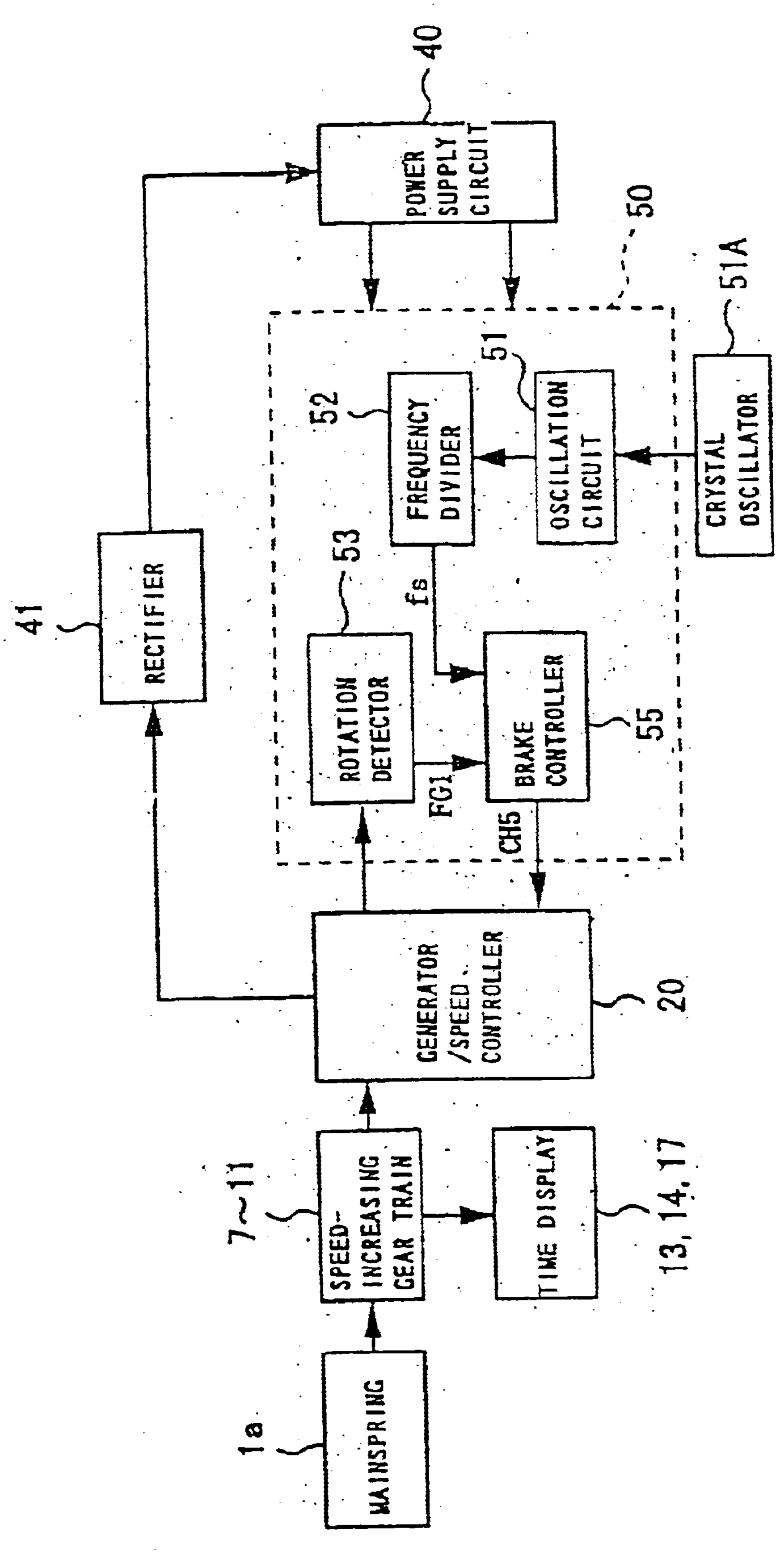
FIG. 4 is a block diagram showing a construction of a portion of the timepiece according to the first embodiment.

FIG. 4 is a block diagram showing the construction of the electronically-controlled, mechanical timepiece according to the first embodiment.

The electronically-controlled, mechanical timepiece includes the mainspring 1*a* which serves as a mechanical energy source, the speed-increasing gear train (wheels 7 to 11), and the hands (the minute hand 13, the second hand 14, and the hour hand 17). The speed-increasing gear train (wheels 7 to 11) serve as the energy transmitting device which transmits the torque of the mainspring 1*a* to the generator 20, and the hands 13, 14, and 17 are connected to the wheels 7 to 11 and serve as a time display.

The generator 20 is driven by the mainspring 1*a* via the speed-increasing gear train, generates induced electrical power, and provides electrical energy. An alternating current output from the generator 20 is boosted and rectified by a rectifier 41, which may be a step-up rectifier, a full-wave rectifier, a half-wave rectifier, a transistor rectifier, etc., and is supplied to a power supply circuit 40 comprising a capacitor, etc.

Figure 5:
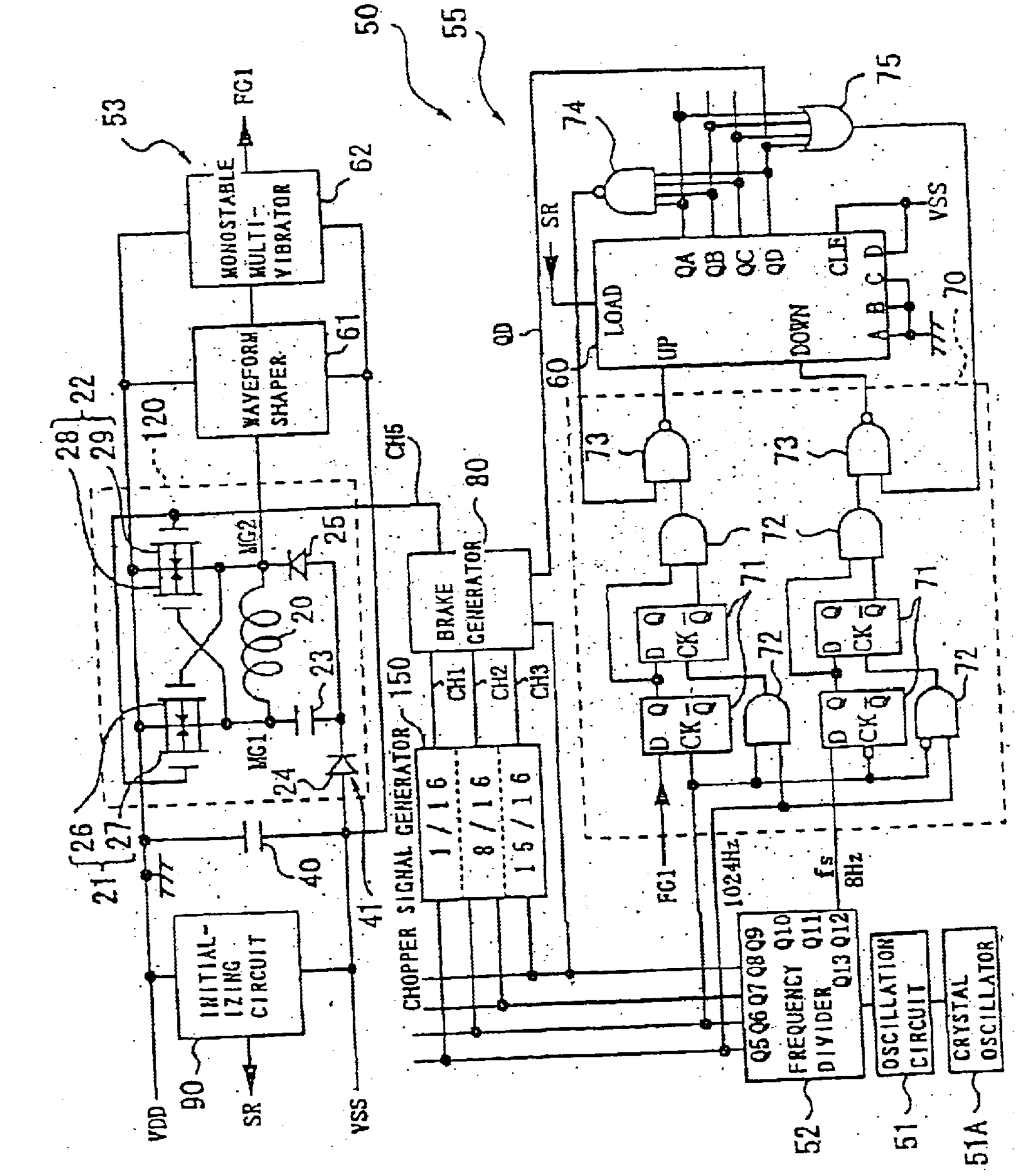
FIG. 5 is a circuit diagram showing a construction of the electronically-controlled, mechanical timepiece according to the first embodiment.

As shown in FIG. 5, in the first embodiment, the generator 20 is provided with a brake circuit 120 which includes the rectifier 41. The brake circuit 120 includes a first switch 21 connected to a first AC input terminal MG1 and a second switch 22 connected to a second AC input terminal MG2. The alternating current generated by the generator 20 is input to the first and second AC input terminals MG1 and MG2. When the first and second switches 21 and 22 are turned on at the same time, the first and second AC input terminals MG1 and MG2 are shorted so that a closed loop is formed, and a short brake is thereby activated.

The first switch 21 includes a first field effect transistor (FET) 26, which is a p-channel transistor, and a second field effect transistor 27, which is connected in parallel to the first field effect transistor 26. The gate of the first field effect transistor 26 is connected to the second AC input terminal MG2, and a chopping signal (chopper pulse) CH5 from a brake generator 80, which will be described below, is input to the gate of the second field effect transistor 27.

The second switch 22 includes a third field effect transistor (FET) 28, which is a p-channel transistor, and a fourth field effect transistor 29, which is connected in parallel to the third field effect transistor 28. The gate of the third field effect transistor 28 is connected to the first AC input terminal MG1, and the chopping signal CH5 from the brake generator 80 is input to the gate of the fourth field effect transistor 29.

The first field effect transistor 26 is turned on when the polarity of the second AC input terminal MG2 is "−", and the third field effect transistor 28 is turned on when the polarity of the first AC input terminal MG1 is "−". More specifically, one of the transistors 26 and 28 that is connected to one of the terminals MG1 and MG2 of which the polarity is "+" is turned on, and the other one of the transistors 26 and 28 is turned off. Accordingly, the field effect transistors 26 and 28 form a switch that functions as a part of the rectifier 41.

In addition, the second field effect transistor 27 and the fourth field effect transistor 29, which are connected in parallel to the transistors 26 and 28, respectively, are turned on and off on the basis of the same chopping signal CH5. When both transistors 27 and 29 are turned on by the chopping signal CH5 at the same time, the AC input terminals MG1 and MG2 are shorted and form a closed loop irrespective of the state of the transistors 26 and 28, which are used as rectifier switches, and a short brake is applied to the generator 20. Thus, the switches 21 and 22 connect the terminals MG1 and MG2 of the generator 20 in the form of a closed loop on the basis of the operation of the field effect transistors 27 and 29.

The rectifier (voltage doubler rectifier) 41 includes a capacitor 23 connected to the generator 20 and is used for boosting, diodes 24 and 25, and the switches 21 and 22. The diodes 24 and 25 may be any kind of unidirectional elements which pass current in only one direction. Since the electromotive force of the generator 20 is small especially in electronically-controlled, mechanical timepieces, a Schottky barrier diode, in which a voltage fall Vf is low, is preferably used as the diode 25. In addition, a silicon diode, in which a reverse leakage current is low, is preferably used as the diode 24. A direct current signal obtained by the rectifier 41 charges the power supply circuit (capacitor) 40.

The brake circuit 120 is controlled by a rotation controller 50 which is driven by the electrical power supplied from the power supply circuit 40. As shown in FIG. 4, the rotation controller 50 includes an oscillation circuit 51, a frequency divider 52, a rotation detector 53 which detects the rotation of the rotor 12, and a brake control circuit 55 which serves as a brake control unit.

The oscillation circuit 51 outputs an oscillation signal (32768 Hz) obtained from a crystal oscillator 51A which serves as a time reference source. The oscillation signal is frequency-divided to a signal having a predetermined period by the frequency divider 52, which has twelve stages of flip-flops. An output Q12 from the twelfth stage in the frequency divider 52 is output as an 8-Hz reference signal fs.

The rotation detector 53 includes a waveform shaper 61 connected to the generator 20 and a monostable multivibrator 62. The waveform shaper 61 includes an amplifier and a comparator, and converts a sinusoidal wave signal into a rectangular wave signal. The monostable multivibrator 62 functions as a bandpass filter that passes pulses having a period longer than a predetermined value, and outputs a rotation signal FG1 with noise filtered out therefrom.

The brake control circuit 55 includes an up/down counter 60, a synchronizing circuit 70, a chopping signal generator 150, and the brake generator 80, which serves as chopping signal selector.

The rotation signal FG1 from the rotation detector 53 and the reference signal fs from the frequency divider 52 are input to an UP terminal and a DOWN terminal of the up/down counter 60 via the synchronizing circuit 70.

The synchronizing circuit 70 includes four flip-flops 71, AND gates 72, and NAND gates 73. The synchronizing circuit 70 synchronizes the rotation signal FG1 with the reference signal fs (8 Hz) using outputs Q5 and Q6 from the fifth stage (1024 Hz) and the sixth stage (512 Hz), respectively, of the frequency divider 52, and adjusts the pulses of these signals so that they are not output at the same time.

The up/down counter 60 is formed of a 4-bit counter. A signal on the basis of the rotation signal FG1 is input to the UP terminal of the up/down counter 60 from the synchronizing circuit 70, and a signal on the basis of the reference signal fs is input to the DOWN terminal from the synchronizing circuit 70. Accordingly, the up/down counter 60 counts the reference signal fs and the rotation signal FG1, and calculates the difference therebetween at the same time.

The up/down counter 60 is provided with four data input terminals (preset terminals) A to D, and a high-level signal is input to the terminals A to C, so that the initial value (preset value) of the up/down counter 60 is set to "7".

An initializing circuit 90, which outputs a system reset signal SR in accordance with the voltage of the power supply circuit 40, is connected to a LOAD input terminal of the up/down counter 60. In the first embodiment, the initializing circuit 90 outputs a high-level signal until the charging voltage of the power supply circuit 40 reaches a predetermined voltage, and outputs a low-level signal when the charging voltage exceeds the predetermined voltage.

The up/down counter 60 does not accept a count-up signal or a count-down signal until a low-level signal is input to the LOAD terminal, that is, until the system reset signal SR is output, so that the count of the up/down counter 60 is maintained at "7".

The up/down counter 60 has four bit outputs QA to QD. The fourth output QD outputs a low-level signal when the count is "7" or smaller, and outputs a high-level signal when the count is "8" or greater. The output QD is connected to the brake generator 80.

The outputs QA to QD are input to a NAND gate 74 and an OR gate 75. An output from the NAND gate 74 is input to one of the NAND gates 73, and an output from the OR gate 75 is input to the other one of the NAND gates 73. In addition, outputs from the from the synchronizing circuit 70 are also input to the NAND gates 73. When, for example, the count-up signal is repeatedly input to the UP terminal causing the count to reach "15", the NAND gate 74 outputs a low-level signal. Thus, even when an additional count-up signal is input to the NAND gate 73, the input is canceled so that no more count-up signal is input to the up/down counter 60. Similarly, when the count is reduced to "0", the OR gate 75 outputs a low-level signal, so that no more count-down signal is input. Accordingly, the count is prevented from shifting from "15" to "0", or shifting from "0" to "15".

The chopping signal generator 150 is constructed of logic circuits, and outputs three chopping signals CH1 to CH3 having different duty factors on the basis of the outputs Q5 to Q8 obtained from the frequency divider 52.

The chopping signal CH1 has a small duty factor of 1/16, and the chopping signal CH3 has a large duty factor of 15/16. The duty factor of the chopping signal CH2 is 8/16, which is between the duty factors of the chopping signals CH1 and CH3. The chopping signals CH1 to CH3 have the same frequency which is fixed to, for example, 128 Hz.

Figure 6:
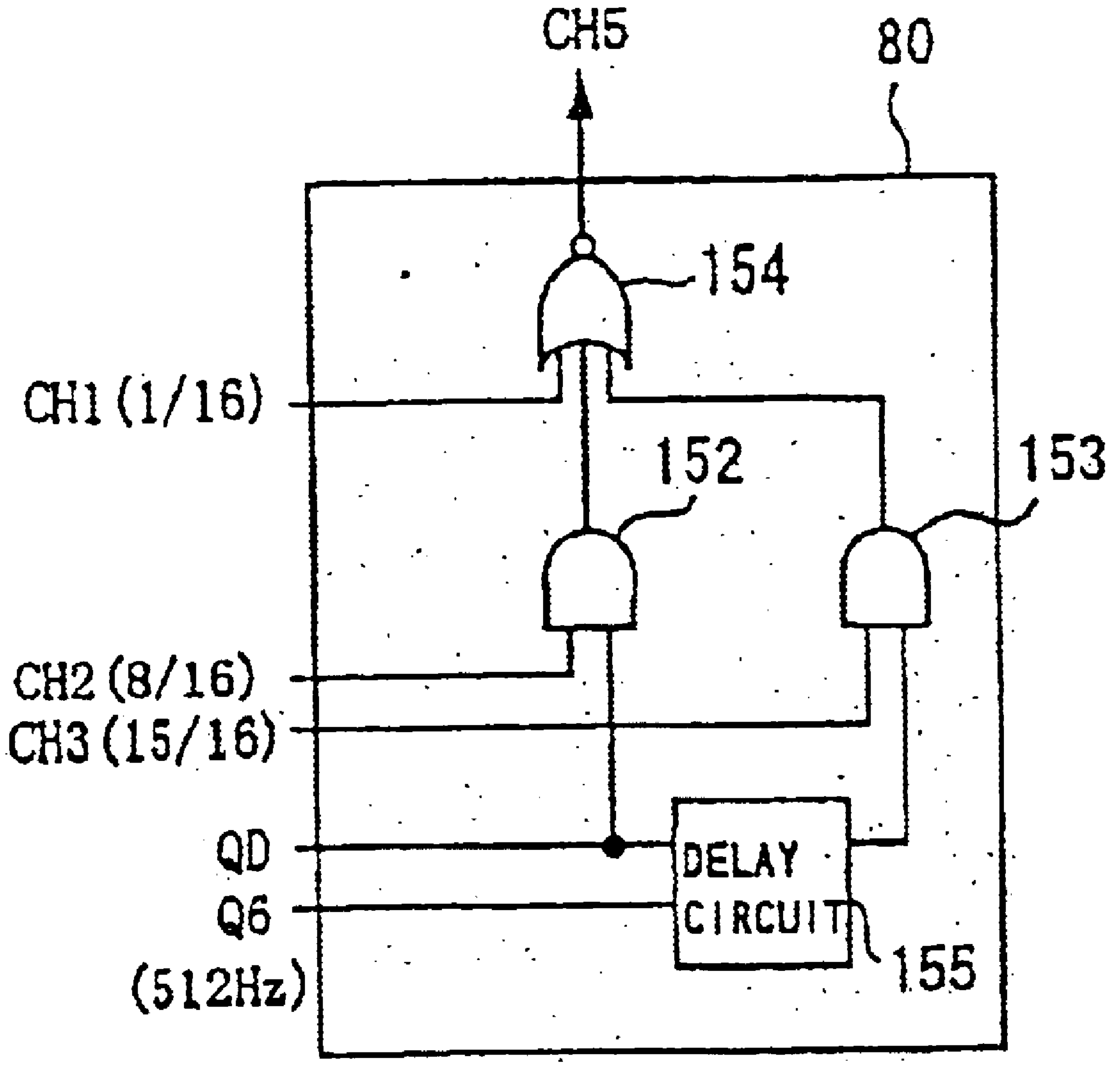
FIG. 6 is a block diagram showing a brake generator, which serves as chopping signal selector, according to the first embodiment.

As shown in FIG. 6, the brake generator 80 includes AND gates 152 and 153, a NOR gate 154, and a delay circuit 155.

The AND gate 152 receives the chopping signal CH2 and the output QD from the up/down counter 60, and the AND gate 153 receives the chopping signal CH3 and the output QD, which is delayed four pulses of the output Q6 (512 Hz) by the delay circuit 155.

Thus, when the output QD is changed to a high-level signal, the chopping signal CH3 is output from the AND gate 153 after the chopping signal CH2 has been output from the AND gate 152 for two periods.

Accordingly, when the output QD is a low-level signal and outputs from the AND gates 152 and 153 are also low-level signals, the inversion of the chopping signal CH1 is output from the NOR gate 154 as a chopping signal CH5.

Then, if the output QD is changed to a high-level signal, the chopping signal CH2 is output from the AND gate 152 for the first two periods while a low-level signal is output from the AND gate 153. During this time, the inversion of the chopping signal CH2 is output from the NOR gate 154.

Then, after the output from the AND gate 153 is changed to the chopping signal CH3, the inversion of the chopping signal CH3 is output from the NOR gate 154.

The chopping signal CH5 output from the NOR gate 154 of the brake generator 80 is input to the gates of the p-channel transistors 27 and 29. Thus, while the level of the chopping signal CH5 is low, the transistors 27 and 29 are turned on so that the generator 20 is shorted and the brake is applied thereto.

In addition, while the level of the chopping signal CH5 is high, the transistors 27 and 29 are turned off so that the brake is not applied to the generator 20. Accordingly, chopper control of the generator 20 is performed on the basis of the chopping signal CH5.

The above-described duty factor is the rate of time in which the brake is applied to the generator 20 in a single period. More specifically, in the first embodiment, the duty factor is the rate of time in which the level of the chopping signal is high in a single period.

Figure 7:
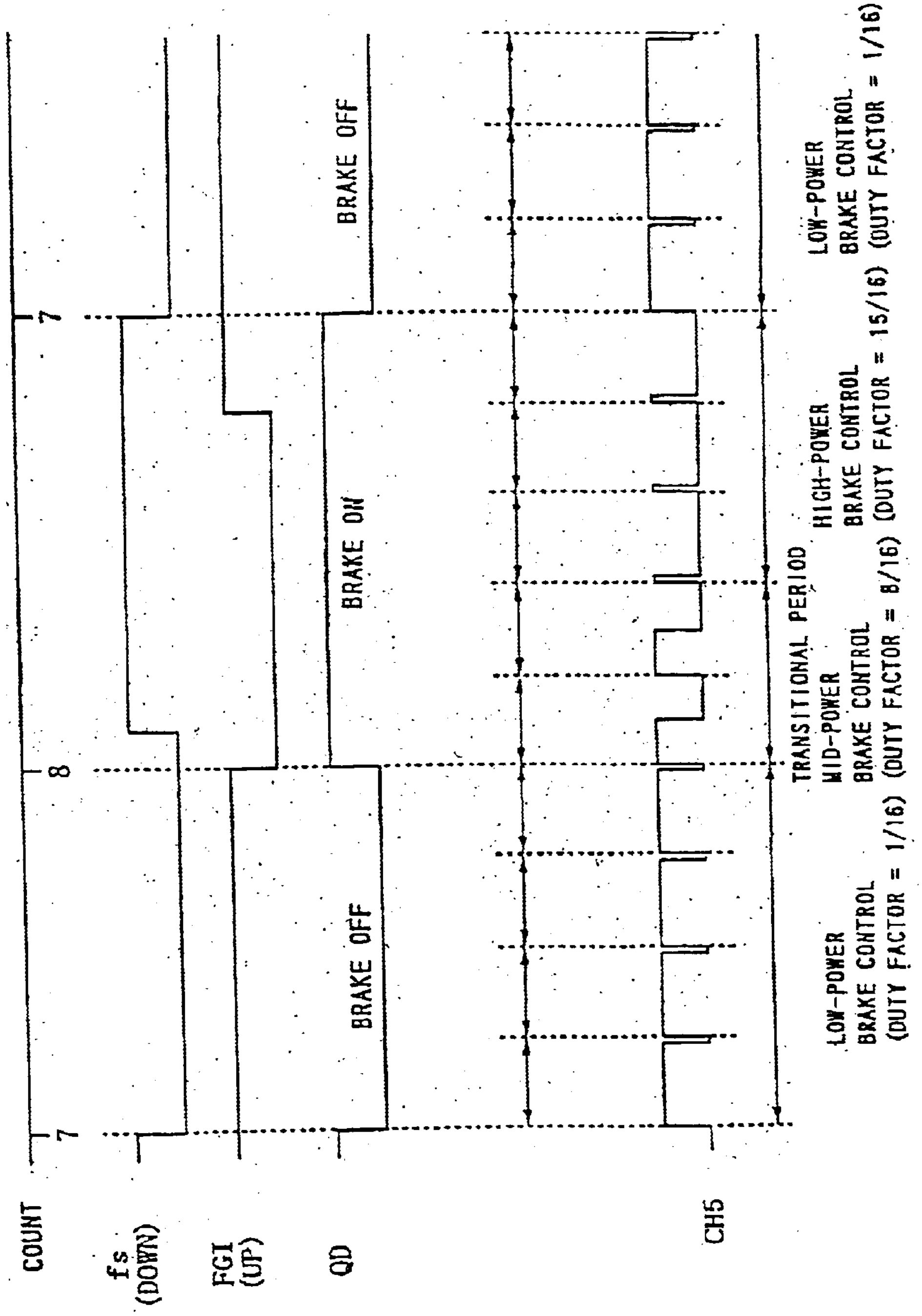
FIG. 7 is a timing chart showing the manner in which the output signal from the brake generator changes according to the first embodiment.
Figure 8:
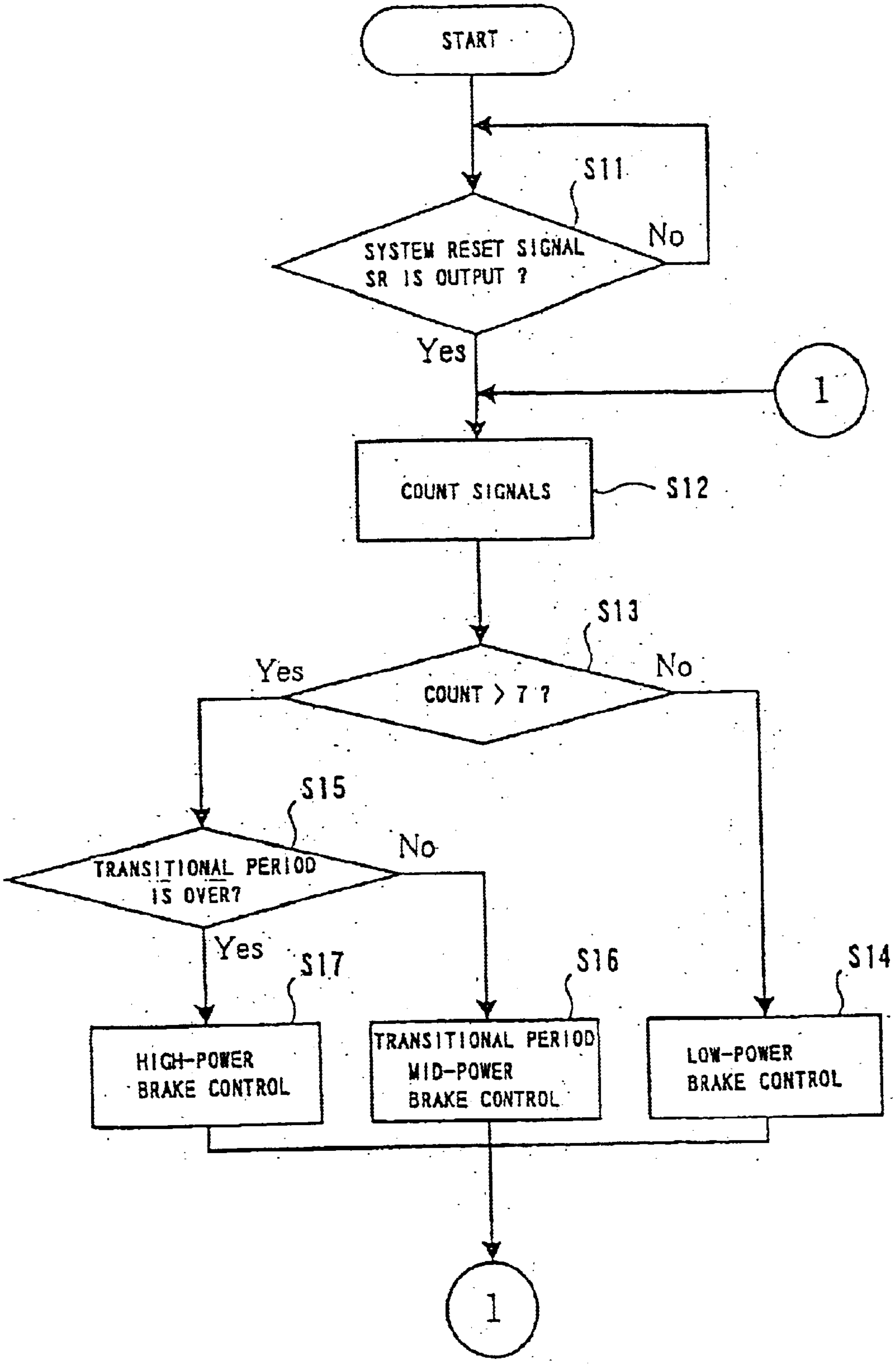
FIG. 8 is a flow chart showing a control process according to the first embodiment.

The operation of the first embodiment will be described below with reference to a timing chart shown in FIG. 7 and a flow chart shown in FIG. 8.

First, the generator 20 is activated and a low-level system reset signal SR is input from the initializing circuit 90 to the LOAD terminal of the up/down counter 60 at Step 11 (hereinafter, Step is simply denoted by "S"). Then, as shown in FIG. 7, the up/down counter 60 counts the count-up signal on the basis of the rotation signal FG1 and the count-down signal on the basis of the reference signal fs (S12). The synchronizing circuit 70 adjusts these signals so that they are not input to the up/down counter 60 at the same time.

Thus, the present count "7" is changed to "8" when the count-up signal is input, and a high-level signal is transmitted from the output QD to the AND gates 152 and 153 of the brake generator 80. Then, when the count-down signal is input and the count returns to "7", a low-level signal is transmitted from output QD.

The chopping signal generator 150 outputs the chopping signals CH1 to CH3 using the outputs Q5 to Q8 from the frequency divider 52.

When a low-level signal is transmitted from the output QD of the up/down counter 60 (when the count is "7" or smaller), the output signals from the AND gates 152 and 153 are also at a low level. Thus, the inversion of the chopping signal CH1 having a small duty factor (the rate of time in which the transistors 27 and 29 are on) is output from the NOR gate 154 as the chopping signal CH5. Accordingly, the time in which the level of the chopping signal CH5 is high (and the brake is released) is long and the time in which the level of the chopping signal CH5 is low (and the brake is applied) is short. The total time in which the brake is applied is short, and practically no brake is applied to the generator 20. In this manner, a low-power brake control in which power generation (electromotive force) is prioritized is performed (S13 and S14).

When a high-level signal is transmitted from the output QD of the up/down counter 60 (when the count is "8" or greater), during the first two periods, that is, during a transitional period from the brake-off control to the brake-on control (15), a mid-power brake control using the chopping signal CH2 is performed (S16). Since the duty factor is 8/16=½, the time in which the brake is applied and the time in which the brake is released are the same. Thus, the mid-power brake control in which the braking force is between those of the low-power brake control and a high-power brake control, which will be described below, is performed.

Then, when the count is "8" or greater at S13 and the transitional period (four pulses of the 512 Hz output Q6, that is, two periods of the 256 Hz chopping signal CH2) is over (S15), the inversion of the chopping signal CH3 having a large duty factor (15/16) is output from the NOR gate 154 as the chopping signal CH5. Accordingly, the time in which the level of the chopping signal CH5 is high (and the brake is released) is short and the time in which the level of the chopping signal CH5 is low (and the brake is applied) is long. Also in this case, the chopper control of the generator 20 is performed, so that the braking torque is increased while the reduction of power generation is suppressed. However, since the time in which the brake is not applied is short (1/16), a high-power brake control in which the braking force (b)raking torque) is prioritized to power generation (electromotive force) is performed (S17).

The rectifier 41 stores the electricity generated by the generator 20 in the power supply circuit 40 by the following method. When the polarity of the first terminal MG1 is "+" and the polarity of the second terminal MG2 is "−", the first field effect transistor (FET) 26 is turned on and the third field effect transistor (FET) 28 is turned off. Thus, the electricity of the induced voltage generated at the generator 20 charges the capacitor 23 having a capacitance of, for example, 0.1 μF, in a circuit of "the first terminal MG1→the capacitor 23→the diode 25→the second terminal MG2". In addition, the electricity also charges the power supply circuit (capacitor) 40 having a capacitance of, for example, 10 μF, in a circuit of "the first terminal MG1→the first switch 21→the power supply circuit 40→the diode 24→the diode 25→the second terminal MG2"

In addition, when the polarity of the first terminal MG1 is changed to "−" and the polarity of the second terminal MG2 is changed to "+", the first field effect transistor (FET) 26 is turned off and the third field effect transistor (FET) 28 it turned on. Thus, the power supply circuit (capacitor) 40 is charged at the total voltage including the induced voltage generated at the generator 20 and the charging voltage of the capacitor 23 in a circuit of "the capacitor 23→the first terminal MG1→the generator 20→the second terminal MG2→the second switch 22→the power supply circuit 40→the diode 24→the capacitor 23".

In each of the above-described states, when both ends of the generator 20 are connected in the form of a closed loop on the basis of the chopping signal CH5 and then released, a high voltage is induced across the coil. Then, the power supply circuit 40 is charged at this high voltage, so that the charging efficiency is increased.

When the torque of the mainspring 1*a* is large and the generator 20 rotates at a high speed, an additional count-up signal may be input even after the count has reached "8". In such a case, the count rises to "9" and the output QD remains at a high level, so that the high-power brake control, in which the brake is periodically applied and released on the basis of the inversion of the chopping signal CH3, is performed. While the brake is applied, the rotational speed of the generator 20 decreases. If the reference signal fs (count-down signal) is input twice before the rotation signal FG1 is input, the count falls to "8" and then to "7", and the low-power brake control is performed when the count reaches "7". If the torque of the mainspring 1*a* is especially high, the count may continue rising and reach "9", "10", and so on. However, in such a case, the high-power brake control is continuously performed, so that a large braking force is applied to the generator 20 and the rotational speed thereof is quickly reduced.

When the braking force is controlled as described above, the rotational speed of the generator 20 is made closer to a reference rotational speed that is set in advance, and the count enters a locked state, in which the count-up signal and the count-down signal are alternately input and the count alternates between "8" and "7". In the locked state, the low-power brake control, the high-power brake control are repeatedly performed in accordance with the count, and the mid-power brake control is performed in a transitional period at which the low-power brake control is switched to the high-power brake control.

Then, when the mainspring 1*a* is further unwound and the torque thereof is reduced, the time in which the brake is applied gradually decreases. Thus, the rotational speed of the generator 20 approaches a reference rotational speed even when no brake is applied.

Then, if the count-down signal is repeatedly input with no brake applied at all and the count becomes "6" or smaller, the torque of the mainspring 1*a* is regarded as diminished. Thus, the user is informed that the mainspring 1*a* needs to be rewound by stopping the hands, moving the hands at an extremely low speed, sounding a buzzer, turning a light on, etc.

In the first embodiment, while the output QD is a low-level signal, the rate of time in which the level of the chopping signal CH5 is high to time in which the level thereof is low is 15:1. That is, the duty factor of the chopping signal CH5 is 1/16=0.062. In addition, immediately after the output QD is changed to a high-level signal, that is, in the transitional period, the rate of time in which the level of the chopping signal CH5 is high to the time in which the level thereof is low is 8:8. That is, the duty factor of the chopping signal CH5 is 8/16=0.5. In addition, when the output QD maintains to be a high-level signal after the transitional period, the rate of time in which the level of the chopping signal CH5 is high to the time in which the level thereof is low is 1:15. That is, the duty factor of the chopping signal CH5 is 15/16=0.9375.

In addition, the generator 20 outputs, via the terminals MG1 and MG2, an alternating current in accordance with the change in magnetic flux. The chopping signal CH5 having a constant frequency and a varying duty factor is fed to the transistors 27 and 29 (switches 21 and 22). When the output QD is a high-level signal, that is, when the high-power brake control is performed, the time in which the short brake is applied in each chopping cycle is increased, so that the braking force is increased and the rotational speed of the generator 20 is reduced. Although the amount of power generation is reduced since the brake is applied, energy accumulated while the brake is being applied is output when the switches 21 and 22 are turned off on the basis of the chopping signal, and is used for performing a chopper boost. Accordingly, the reduction in power generation can be compensated for, and the braking force can be increased while the reduction in power generation is suppressed.

When a low-level signal is transmitted from the output QD, that is, when the low-power brake control is performed, the time in which the brake is applied in each chopping cycle is reduced, so that the braking force is reduced and the rotational speed of the generator 20 is increased. Also in this case, the chopper boost can be performed when the transistors 27 and 29 (switches 21 and 22) are turned off on the basis of the chopping signal. Thus, the amount of power generation can be increased compared to the case in which the rotational speed is controlled without applying the brake at all.

The alternating current output from the generator 20 is boosted and rectified by the voltage doubler rectifier 41 and charges the power supply circuit (capacitor) 40, which drives the rotation controller 50.

The output QD from the up/down counter 60 and the chopping signal CH5 both utilize the outputs Q5 to Q8 and Q12 of the frequency divider 52. More specifically, the frequency of the chopping signal CH5 is set to an integer multiple of the frequency of the output QD. Accordingly, switching of the output level of the output QD, that is, switching between the high-power brake control and the low-power brake control, occurs synchronously with the chopping signal CH5.

The first embodiment has the following advantages:

When the brake control mode of the generator 20 is changed from the low-power brake control to the high-power brake control (in the transitional period), the low-power brake control is not immediately changed to the high-power brake control. Instead, the mid-power brake control is performed first, and then the high-power brake control is performed. Accordingly, the rotor 12 can be reliably prevented from being stopped because of an excessive braking force applied to the generator 20.

Accordingly, in the electronically-controlled, mechanical timepiece, the stopping of the hands connected to the rotor 12, which occurs when the rotor 12 of the generator 20 stops, can be reliably prevented.

Since the mid-power brake control is performed for two periods before the low-power brake control is switched to the high-power brake control, sudden reduction of the rotational speed of the rotor 12 can be avoided and vibration of hands connected to the rotor can be suppressed. Accordingly, the hands can be steadily moved and the appearance of the electronically-controlled, mechanical timepiece can be improved, so that the commercial value can be increased. In addition, the time display accuracy can also be increased.

Although the mid-power brake control is not performed when the high-power brake control is switched to the low-power brake control, when the low-power brake control is switched again to the high-power brake control, the mid-power brake control is performed for two periods. Accordingly, especially in the locked state, in which the rotational speed of the generator 20 is close to the set rotational speed and the count-up signal and the count-down signal are alternately input, the high-power brake control is switched to the low-power brake control before the braking force is excessively increased. Therefore, also in the case in which the high-power brake control is switched to the low-power brake control, sudden increase of the rotational speed of the rotor 12 can be prevented. Accordingly, the appearance of the electronically-controlled, mechanical timepiece can be improved and the commercial value thereof can be increased.

The count-up signal on the basis of the rotation signal FG1 and the count-down signal on the basis of the reference signal fs are input to the up/down counter 60. When the count of the rotation signal FG1 (count-up signal) is greater than that of the reference signal fs (count-down signal), that is, when the count is "8" or greater in the case in which the initial count of the up/down counter 60 is "7", the brake circuit 120 applies a high-power brake on the generator 20. When the count of the rotation signal FG1 is equal to or smaller than that of the reference signal fs, that is, when the count is "7" or smaller, a low-power brake is applied to the generator 20. With this arrangement, the rotational speed of the generator 20 quickly approaches the reference speed even when the initial rotational speed of the generator 20 differs from the reference speed by a large amount. Accordingly, the response time of the rotational speed control can be reduced.

In addition, since the high-power brake control, the mid-power brake control, and the low-power brake control are switched on the basis of the chopping signal CH5 having a varying duty factor, the braking force (braking torque) can be increased without reducing the charging voltage (generated voltage). Especially in the high-power brake control, since the chopping signal having a large duty factor is used, the braking torque can be increased while the reduction in the charging voltage is suppressed. In this way, the brake can be efficiently applied while the reliability of the system is maintained. Accordingly, the duration of the electronically-controlled, mechanical timepiece can be increased.

Furthermore, when the high-power brake control is selected, the brake control is performed by two steps: the mid-power brake control and the high-power brake control, in which different braking torques on the basis of different duty factors are applied. Thus, the high-power brake control can be performed more effectively and a sufficient braking force can be applied while the reduction in power generation is suppressed.

Since the chopper control is also performed in the low-power brake control, the charging voltage obtained while a small braking force is applied can be increased. More specifically, when the chopping signal having the duty factor of 1/16 is used, the charging voltage can be ensured while the braking torque is reduced.

Since the switching between the high-power brake control (including the mid-power brake control) and the low-power brake control is performed on the basis of whether the count is "7" or smaller, or "8" or greater, there is no need to set a braking time, etc. Thus, the construction of the rotation controller 50 can be made simple and the component cost and the manufacturing cost can be reduced, so that a low-cost, electronically-controlled mechanical timepiece can be provided.

The time duration in which the count is "8", that is, the time duration in which the brake is applied, can be automatically adjusted since the time at which the count-up signal is input is varied depending on the rotational speed of the generator 20. For this reason, fast and stable response control can be performed, particularly in the locked state in which the count-up signal and the count-down signal are alternately input.

Since the up/down counter 60 is used in the brake control unit, the count-up signal and the count-down signal can be automatically counted and compared (difference therebetween can be obtained) at the same time. Accordingly, the construction of the brake control unit can be made simpler and the difference between the counts can be easily obtained.

Since the 4-bit up/down counter 60 is used, it can count up to sixteen. When, for example, the count-up signal is repeatedly input, the inputs can be cumulatively counted. Thus, within a set range, that is, until the count-up signal or the count-down signal is repeatedly input and the count rises to "15" or falls to "0", a cumulative error can be corrected. Accordingly, even when the rotational speed of the generator 20 substantially deviates from the reference speed, it reverts back to the reference speed with the cumulative error reliably corrected, although it takes time for the up/down counter 60 to reach the locked state. This control proves effective in maintaining accurate timekeeping.

The initializing circuit 90 does not allow the brake control of the generator 20 at the startup of the generator 20 so that no brake is applied to the generator 20 until a predetermined amount of electricity charges in the power supply circuit 40. Thus, at the startup of the generator 20, charging of the power supply circuit 40 is prioritized. Accordingly, the rotation controller 50, driven by the power supply circuit 40, works smoothly and reliably, and the reliability of the subsequent rotation control can be thereby improved.

The time at which the level of the output QD changes, that is, the time at which the brake control mode switches between the high-power brake control and the low-power brake control, is synchronized with the transition of the chopping signal CH5 from on to off. Thus, high voltage outputs (impulses) are regularly obtained in synchronization with the chopping signal CH5 of the generator 20. These outputs may be used as watch error measurement pulses. If the output QD is not synchronized with the chopping signal CH5, the generator 20 generates a high voltage output every time the level of the output QD changes, independently of the chopping signal CH5 having a constant period. For this reason, the "impulses" from the generator 20 do not necessarily have a constant period, and are not appropriate for use as the watch error measurement pulse. However, if synchronization is assured as in the first embodiment, the impulses may serve as the watch error measurement pulses.

Since the rectification control of the generator 20 is performed at the first and third field effect transistors 26 and 28, of which the gates are connected to the terminals MG1 and MG2, respectively, it is not necessary to use a comparator, etc. Accordingly, the construction can be made simpler, and the charging efficiency can be prevented from being reduced due to the electric power consumed by the comparators. In addition, since the field effect transistors 26 and 28 are turned on and off using the terminal voltage of the generator 20, the field effect transistors 26 and 28 can be controlled in synchronization with the polarities of the terminals of the generator 20 and the rectification efficiency can be increased. In addition, since the second and fourth field effect transistors 27 and 29, controlled on the basis of the chopping signal, are connected in parallel to the transistors 26 and 28, respectively, chopper control can be performed individually. Accordingly, the rectifier 41 which has a simple construction, which is synchronized with the polarity of the generator 20, and which is able to perform chopper rectification while boosting the voltage, can be provided.

Figure 9:
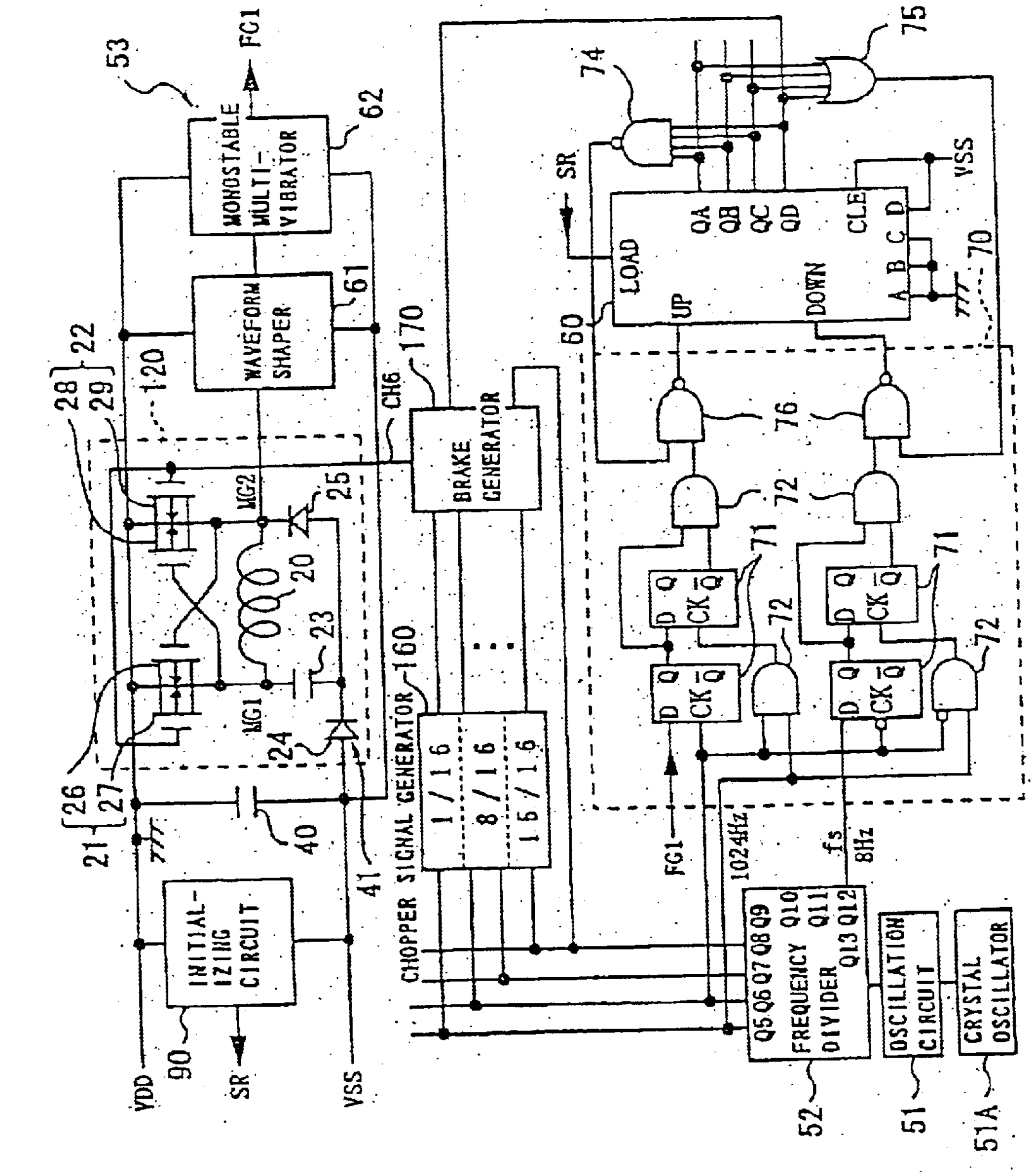
FIG. 9 is a circuit diagram showing a construction of an electronically-controlled, mechanical timepiece according to a second embodiment.

A second embodiment of the present invention will be described below with reference to FIG. 9. In the second embodiment, the components which are the same as or similar to those in the first embodiment are denoted by the same reference numeral, and explanations thereof are thus omitted.

In the second embodiment, a brake generator 170 which serves as chopping signal selector and a chopping signal generator 160 differ from the brake generator and the chopping signal generator described in the first embodiment. Other constructions are the same as described in the first embodiment, and the explanations thereof are thereby omitted.

In the first embodiment, the chopping signal generator 150 generates three kinds of chopping signals. In contrast, in the second embodiment, the chopping signal generator 160 is able to generate fifteen kinds of chopping signals of which the duty factors range from 1/16 to 15/16.

Figure 10:
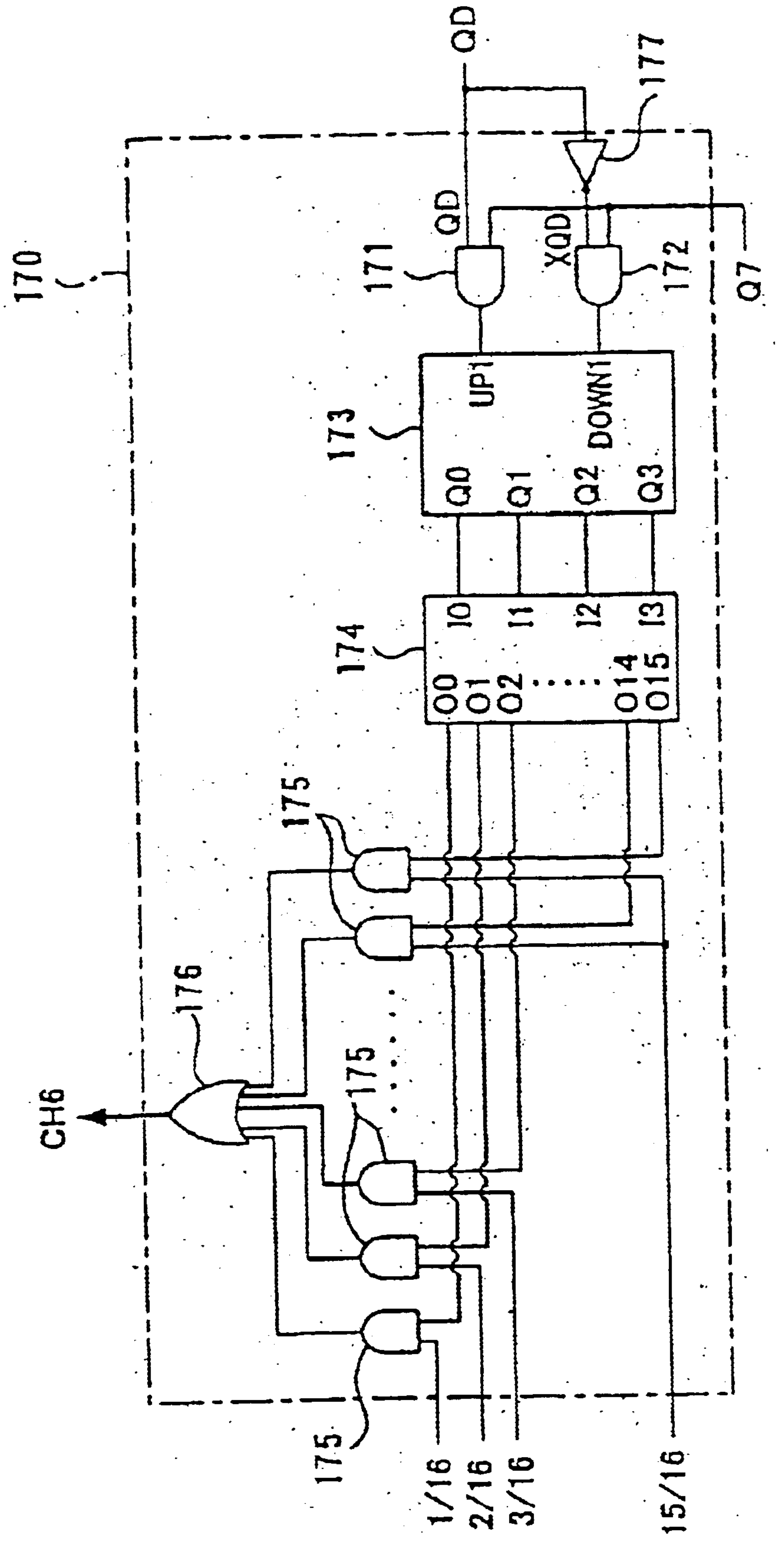
FIG. 10 is a block diagram showing a brake generator, which serves as the chopping signal selector, according to the second embodiment.
Figure 11:
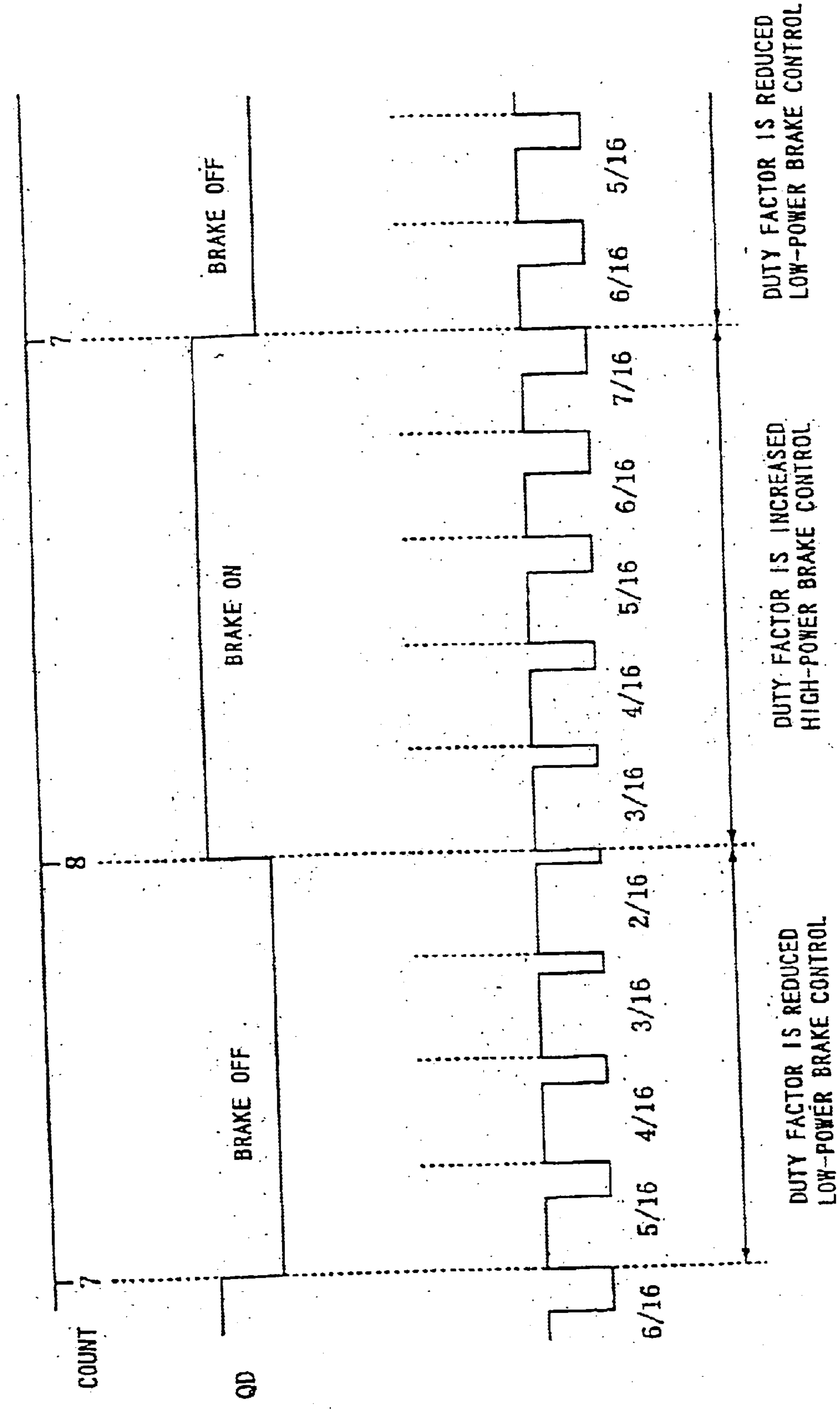
FIG. 11 is a timing chart showing the manner in which the output signal from the brake generator changes according to the second embodiment.

In addition, as shown in FIG. 10, the brake generator 170 includes an AND gate 171 to which the output QD from the up/down counter 60 and the output Q7 (256 Hz) from the frequency divider 52 are input; an AND gate 172 to which an output XQD, which is the inversion of the output QD obtained from by an inverter 177, and the output Q7 are input; an up/down counter 173 to which the output from the AND gate 171 is input to an UPI terminal and the output from the AND gate 172 is input to a DOWN1 terminal; a 4-to-16 decoder 174 to which outputs Q0 to Q3 from the up/down counter 173 are input and which outputs a high-level signal from one of sixteen outputs (O0 to O15) selected on the basis of the inputs Q0 to Q3; AND gates 175 to which the sixteen outputs from the decoder 174 and the fifteen chopping signals having different duty factors generated by the chopping signal generator 160 are individually input; and an OR gate 176 to which the outputs from the AND gates 175 are input.

A chopping signal having a duty factor of 1/16 is input to the AND gate 175 to which the output O0 from the decoder 174 is input. Thus, when a high-level signal is output from the output O0, the chopping signal having a duty factor of 1/16 is output from the OR gate 176 as a chopping signal CH6.

Similarly, chopping signals having duty factors of 2/16 to 15/16 are input to the AND gates 175 to which the outputs O1 to O14 are respectively input. Thus, when a high-level signal is output from one of the outputs O1 to O14, the chopping signal corresponding thereto is output from the OR gate 176 as the chopping signal CH6.

While sixteen outputs are obtained from the decoder 174, only fifteen chopping signals are provided. Therefore, the chopping signal having a duty factor of 15/16 is input to both of the two AND gates 175 to which the outputs O14 and O15 are input. Accordingly, also when a high-level signal is output from the output O15, the chopping signal having a duty factor of 15/16 is output from the OR gate 176 as the chopping signal CH6.

Although not shown in FIG. 10, similarly to the up/down counter 60, no more count-up signal is input after the count of the up/down counter 173 reaches "15", and no more count-down signal is input after the count of the up/down counter 173 falls to "0".

In the second embodiment, as shown in FIG. 10, when a low-level signal is transmitted from the output QD of the up/down counter 60, that is, when the count is "7" or smaller, the output Q7 is input to the DOWN1 terminal of the up/down counter 173 via the AND gate 172. Thus, the 4-bit outputs Q0 to Q3 of the up/down counter 173 gradually decreases.

In the decoder 174, to which the outputs Q0 to Q3 are input, the terminal from which a high-level signal is output shifts from the output 015 to the output O0 at a frequency of 256 Hz. Accordingly, the duty factor of the chopping signal CH6 output from the OR gate 176 also changes at 256 Hz. As the terminal from which a high-level signal is output shifts from the output O14 to the output O0, the duty factor of the chopping signal CH6 output from the OR gate 176 is reduced in steps of 1/16. As a result, the effective braking force is gradually reduced, and a low-power brake control in which power generation (electromotive force) is prioritized is performed at the generator 20.

When a high-level signal is transmitted from the output QD of the up/down counter 60, that is, when the count is "8" or greater, the output Q7 is input to the UPI terminal of the up/down counter 173 via the AND gate 171. Thus, the 4-bit outputs of Q0 to Q3 of the up/down counter 173 gradually increases.

In the decoder 174, to which the outputs Q0 to Q3 are input, the terminal from which a high-level signal is output shifts from the output O0 to the output O15 at the frequency of 256 Hz. Accordingly, the duty factor of the chopping signal CH6 output from the OR gate 176 also changes at 256

Hz. As the terminal from which a high-level signal is output shifts from the output O0 to the output O14, the duty factor of the chopping signal CH6 output from the OR gate 176 is increased in steps of 1/16. As a result, the effective braking force is gradually increased, and a high-power brake control in which the braking force (braking torque) is prioritized to power generation (electromotive force) is performed at the generator 20.

Also in the second embodiment, the advantages obtained by the first embodiment are obtained.

Furthermore, when the brake control mode is switched between the high-power brake control and the low-power brake control, the chopping signal having the duty factor that is larger (in the high-power brake control) or smaller (in the low-power brake control) by one step than the previous chopping signal is used. Thus, the rotational speed of the rotor 12 can be gradually, not suddenly, increased or reduced when the brake control mode is switched. Accordingly, vibration of hands connected to the rotor 12 can be further suppressed and the appearance of the electronically-controlled, mechanical timepiece can be improved, so that the commercial value can be increased.

In addition, during the high-power brake control and the low-power brake control, the duty factor gradually increases or decreases. When the high-power brake control is performed for a long time, that is, when the rotational speed of the rotor 12 largely exceeds the reference speed of the rotor 12, the effective braking force is gradually increased so that the rotational speed can be reliably reduced.

When the low-power brake control is performed for a long time, that is, when the rotational speed of the rotor 12 is lower than the reference speed of the rotor 12, the effective braking force is gradually reduced and the rotational speed can be made closer to the reference speed.

Accordingly, even when the rotational speed of the rotor 12 substantially deviates from the reference speed, an efficient brake control can be performed so that the rotational speed quickly reverts back to the reference speed.

Figure 12:
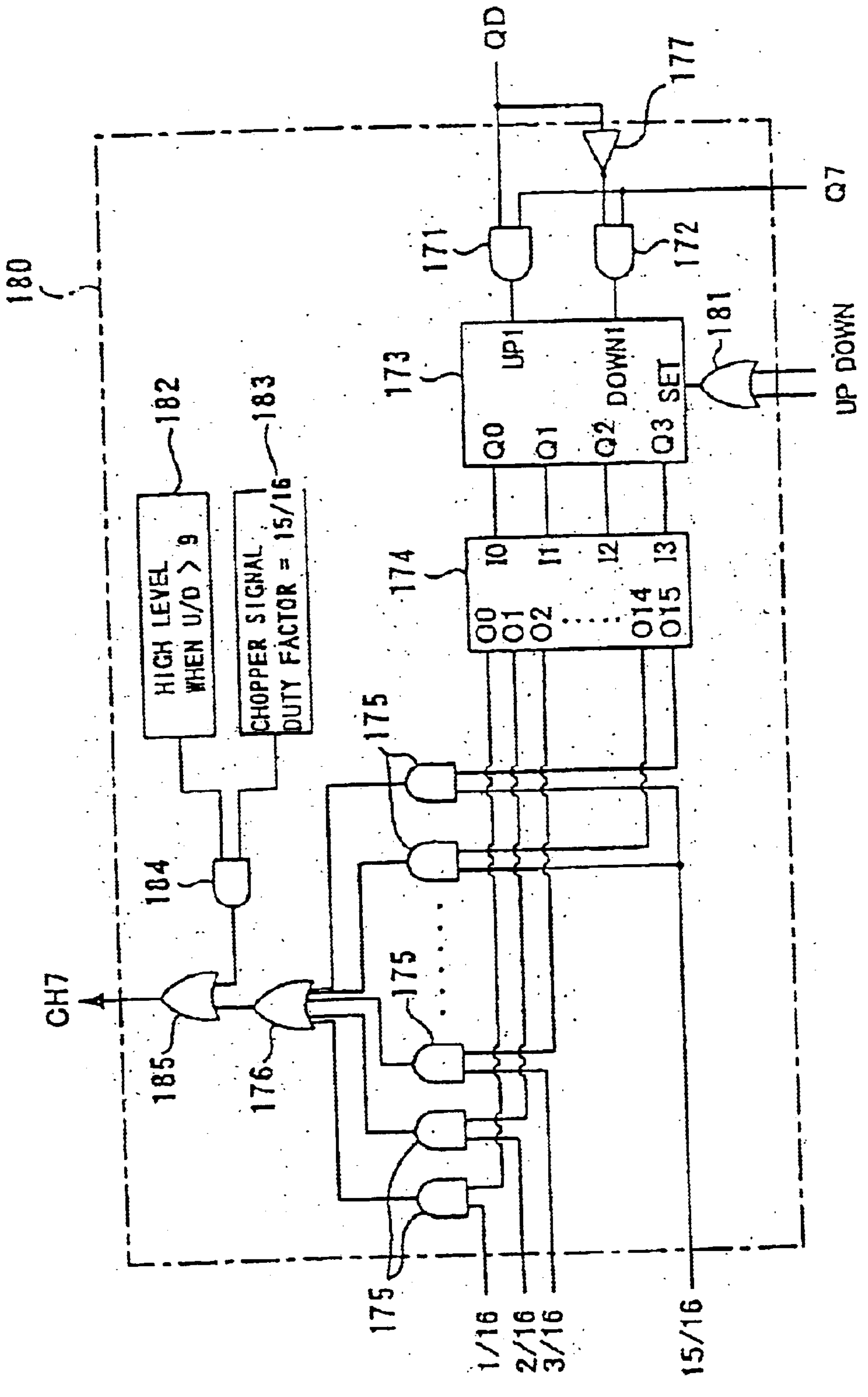
FIG. 12 is a block diagram showing a brake generator, which serves as the chopping signal selector, according to a third embodiment.

A third embodiment of the present invention will be described below with reference to FIGS. 12 and 13. Also in the third embodiment, the components which are the same as or similar to those in the second embodiment are denoted by the same reference numeral, and explanations thereof are thus omitted.

In the third embodiment, a brake generator 180, which is a modification of the brake generator 170 of the second embodiment, is used.

Similarly to the brake generator 170, the brake generator 180 includes the AND gates 171 and 172, the up/down counter 173, the decoder 174, the AND gates 175, the OR gate 176, and the inverter 177.

The brake generator 180 additionally includes an OR gate 181 to which the count-up signal and the count-down signal input to the up/down counter 60 are input and of which the output is input to a SET terminal of the up/down counter 173; a circuit 182 which outputs a high-level signal when the count of the up/down counter 60 is greater than "9"; a circuit 183 which generates a chopping signal having a duty factor of 15/16; an AND gate 184 to which the signals from the circuits 182 and 183 are input; and an OR gate 185 to which the outputs from the AND gate 184 and the above-described OR gate 176 are input.

A chopping signal CH7 output from the OR gate 185 is input to the gates of the field effect transistors 27 and 29 of the switches 21 and 22.

Figure 13:
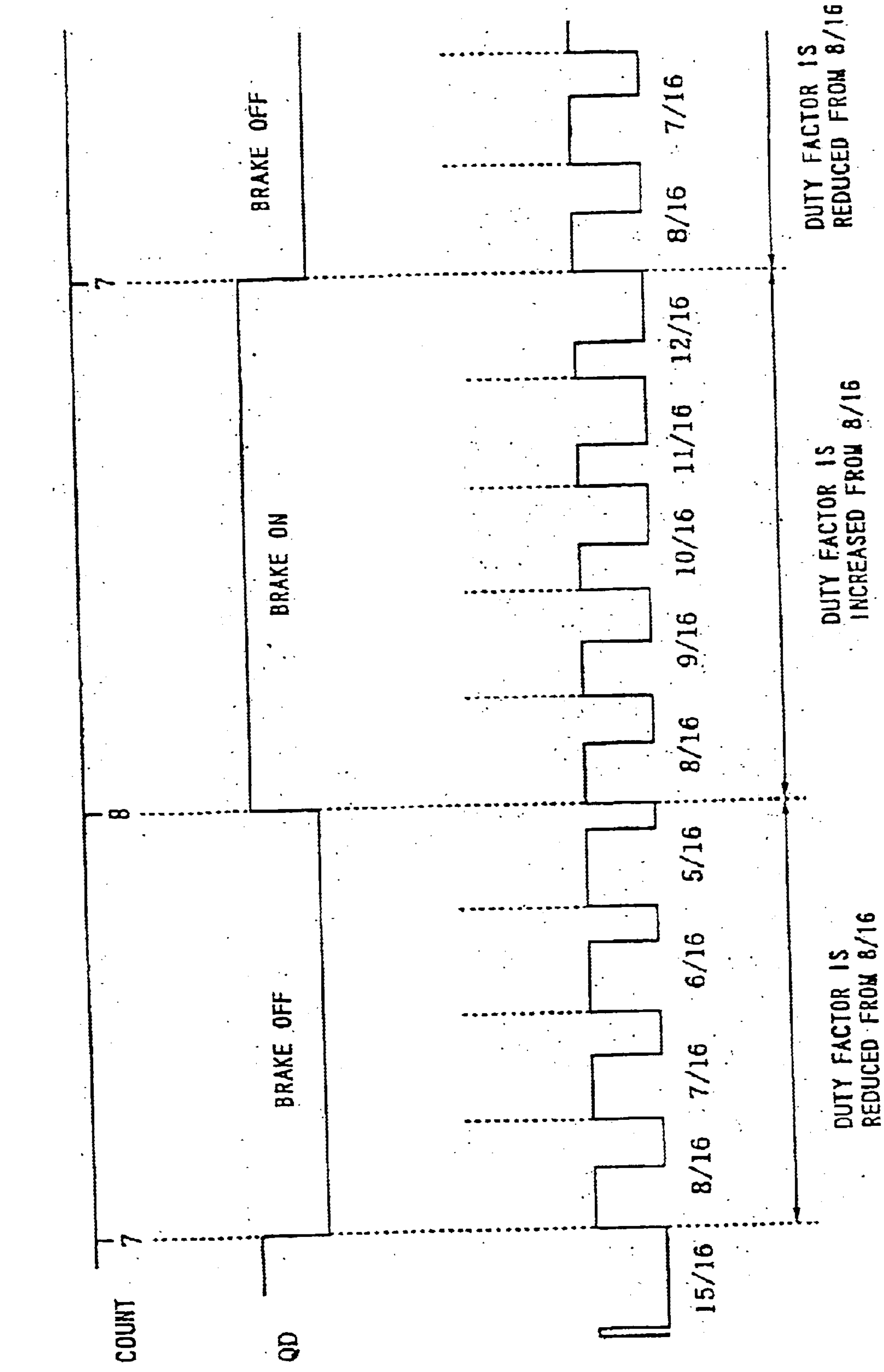
FIG. 13 is a timing chart showing the manner in which the output signal from the brake generator changes according to the third embodiment.

According to the third embodiment, as shown in FIG. 13, when a low-level signal is output from the output QD of the up/down counter 60, that is, when the count is "7" or smaller, the output Q7 is input to the DOWN1 terminal of the up/down counter 173 via the AND gate 172. When the count-up signal or the count-down signal is input to the up/down counter 60, that signal is also input to the SET terminal of the up/down counter 173, and the count of the up/down counter 173 returns to the initial value (in the third embodiment, "7").

Thus, in the decoder 174, to which the outputs Q0 to Q3 are input, a high level signal is first output from the output O7. Accordingly, the chopping signal having a duty factor of 8/16 is first output as the chopping signal CH7. Then, in accordance with the output Q7 that is input to the DOWN 1 terminal, the duty factor of the chopping signal output from the OR gate 176 is reduced in steps of 1/16 at the frequency of 256 Hz. Similarly, the duty factor of the chopping signal CH7 output from the OR gate 185 is also reduced in steps of 1/16 at 256 Hz. As a result, the effective braking force is gradually reduced, and a low-power brake control in which power generation (electromotive force) is prioritized is performed at the generator 20.

When the count reaches "8" or "9" and a high-level signal is output form the output QD of the up/down counter 60, the initial count of the up/down counter 173 returns to "7" due to the input of the count-up signal. Then, the chopping signal having a duty factor of 8/16 is output from the OR gate 176 and form the OR gate 185 as the chopping signal CH7. Then, the duty factor of the chopping signal CH7 is increased in steps of 1/16 at the frequency of 256 Hz. As a result, the effective braking force is gradually increased, and a high-power brake control in which the braking force (braking torque) is prioritized to power generation (electromotive 135 force) is performed at the generator 20.

In addition, although not shown in FIG. 13, when the count of the up/down counter 60 exceeds "9", a high-level signal is output from the circuit 182, so that a chopping signal of which the duty factor is fixed to 15/16 is output as the chopping signal CH7.

Also in the third embodiment, the advantages obtained by the first and second embodiments are obtained.

Additionally, in both the low-power brake control and the high-power brake control, a predetermined effective baking force is initially applied (in the third embodiment, the baking force corresponding to the duty factor of 8/16). Thus, the braking force can be predicted and a program, etc., for the brake control can be made simpler. Accordingly, a situation that the braking force is increased from a small initial braking force (for example, the braking force corresponding to the duty factor of 3/16) in the high-power brake control and the rotational speed thereby becomes excessively high can be prevented. In addition, a situation that the braking force is reduced from a large braking force (for example, the braking force corresponding to the duty factor of 13/16) in the low-power brake control and the rotational speed thereby becomes too low can also be prevented. Thus, the rotational speed can be reliably controlled.

In addition, when the rotational speed of the rotor 12 is particularly high and the count of the up/down counter 60 becomes "10" or more, the high-power brake control in which the duty factor is 15/16 is forcibly performed. In such a case, the rotational speed of the rotor 12 can be effectively reduced and more reliably controlled.

The present invention is not limited to the above-described embodiments, and modifications, improvements, etc., are possible within the scope of the present invention.

For example, in the first embodiment, the mid-power brake control is performed in the transitional period at which the low-power brake control is switched to the high-power brake control. However, as a chopping signal CH10 shown in FIG. 14, the mid-power brake control (duty factor=8/16) can be performed in a transitional period in which the high-power brake control (duty factor=15/16) is switched to the low-power brake control (duty factor=1/16).

In such a case, since the mid-power brake control is performed in the transitional period in which the high-power brake control is switched to the low-power brake control, excessive reduction of the braking force can be prevented.

Figure 14:
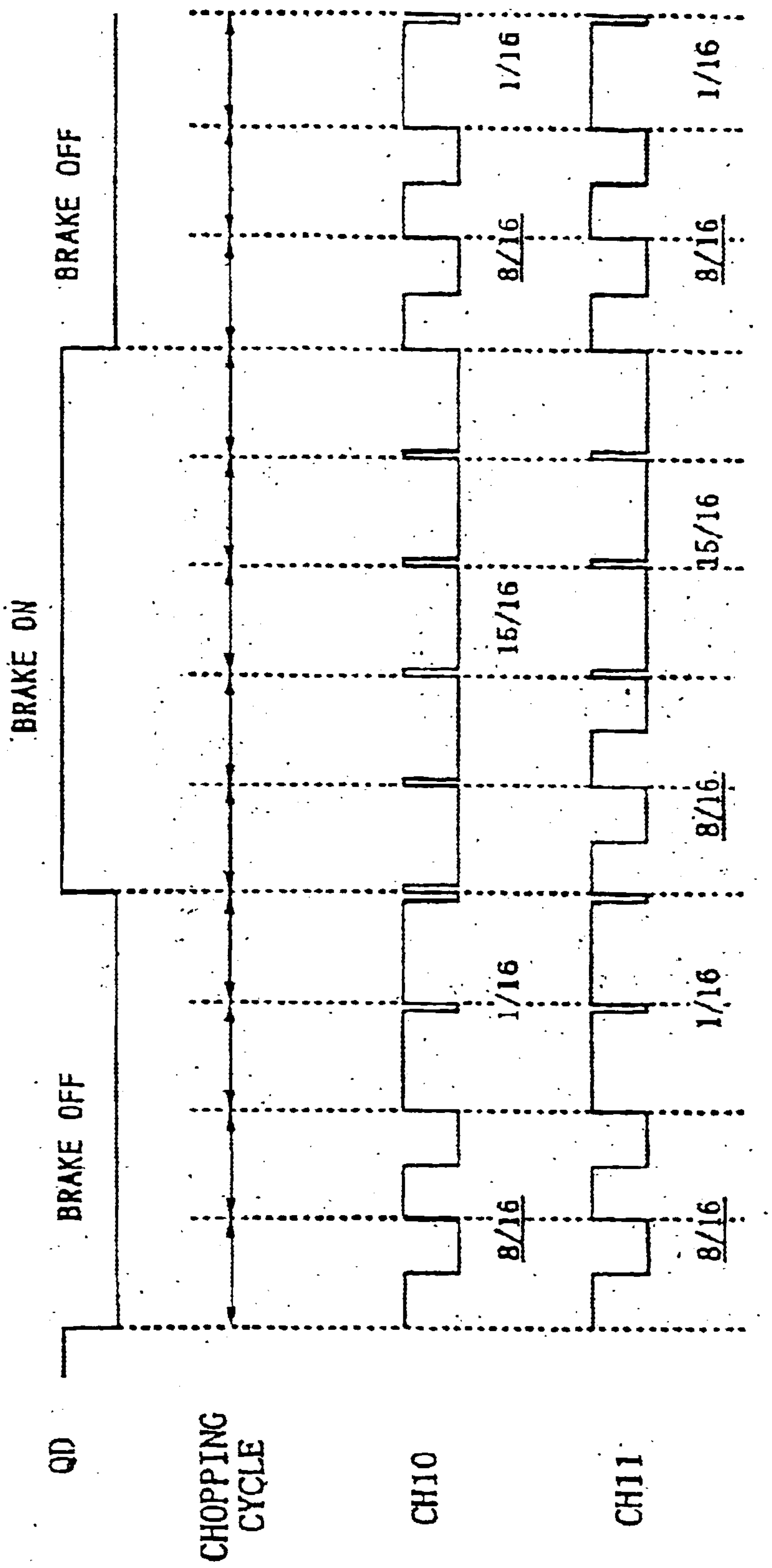
FIG. 14 is a timing chart showing the manner in which the output signals from the brake generator change according to a modification of the present invention.

In addition, as a chopping signal CH11 shown in FIG. 14, the mid-power brake control (duty factor=8/16) can be performed in the transitional period in which the high-power brake control (duty factor=15/16) is switched to the low-power brake control (duty factor=1/16) and in the transitional period in which the low-power brake control is switched to the high-power brake control.

In such a case, the braking force can be prevented from being increased or reduced more than necessary, so that the rotational speed can be more reliably controlled.

In addition, in the second embodiment, the duty factor is increased or reduced in steps of 1/16. However, as a chopping signal CH20 shown in FIG. 15, the duty factor may be increased or reduced in steps of 2/16. In this case, the braking force can be more dynamically controlled.

Figure 15:
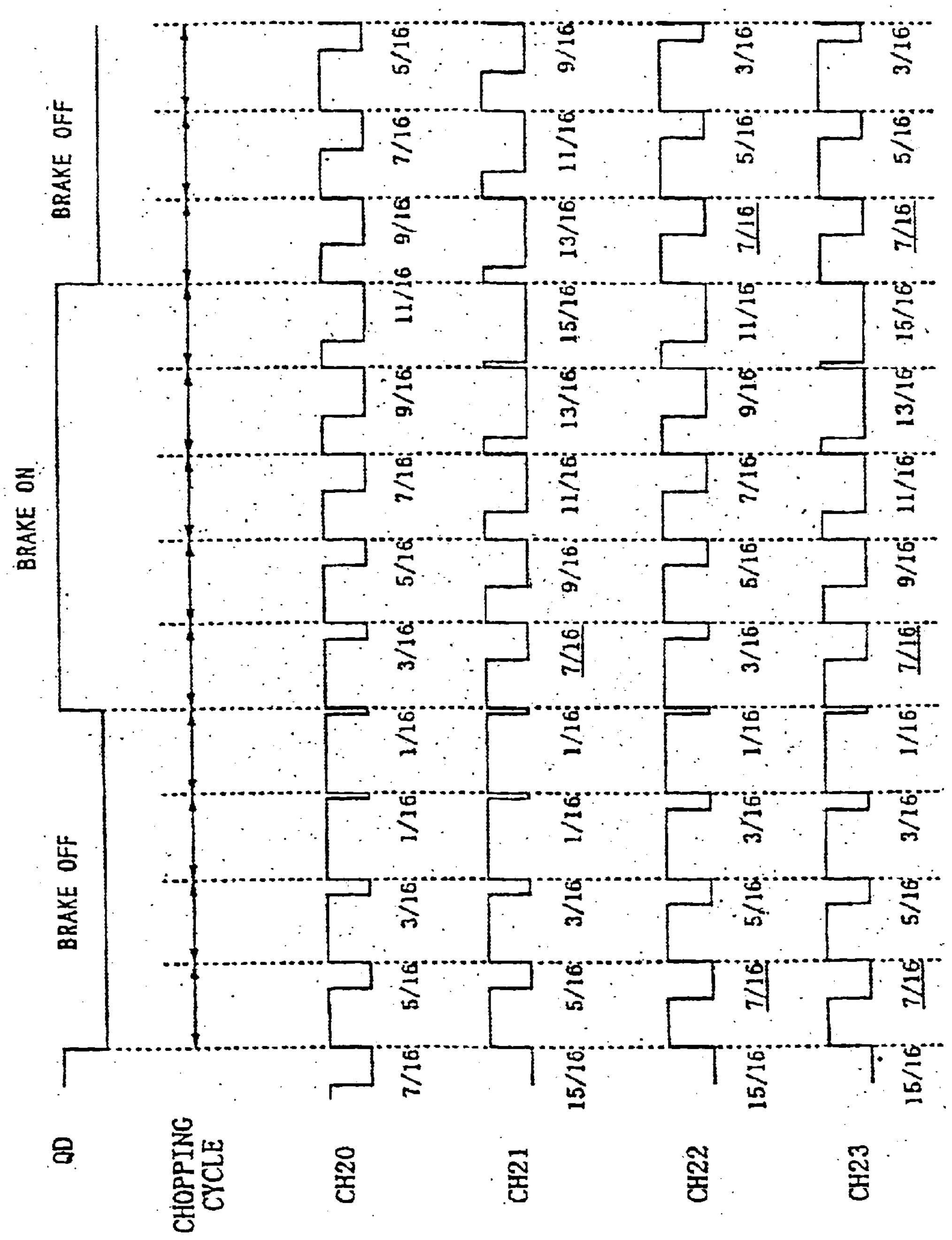
FIG. 15 is a timing chart showing the manner in which output signals from the brake generator change according to another modification of the present invention.

As a chopping signal CH21 shown in FIG. 15, the effective braking force applied at the start of the high-power brake control may be fixed (for example, the duty factor may be fixed to 7/16). In addition, as a chopping signal CH22 shown in FIG. 15, the effective braking force applied at the start of the low-power brake control may be fixed (for example, the duty factor may be fixed to 7/16)

Furthermore, as a chopping signal CH23 shown in FIG. 15, both the effective braking force applied at the start of the high-power brake control and the effective braking force applied at the start of the low-power brake control may be fixed (for example, the duty factor may be fixed to 7/16).

When the effective braking force at the start of the high-power brake control is fixed, the effective braking force starts to increase at the fixed value. Accordingly, a situation that the braking force cannot be increased quickly enough and the rotational speed becomes excessively high can be prevented. As a result, the rotational speed of the rotor 12 can be reliably controlled by applying an optimum braking force.

In addition, when the effective braking force at the start of the low-power brake control is fixed, the effective braking force starts to reduce at the fixed value. Accordingly, a situation that the braking force cannot be reduced quickly enough and the rotational speed becomes too low can be prevented. As a result, the rotational speed of the rotor 12 can be reliably controlled by applying an optimum braking force.

In the chopping signals CH21 to CH23, the duty factor is increased or reduced in steps of 2/16. However, the duty factor may also be increased or reduced it in steps of 1/16 as in the second and third embodiments. In addition, the duty factor may also be increased or reduced in steps of 3/16 or more.

The duty factor at the start of the high-power brake control or the low-power brake control is not limited to 7/16 or 8/16, and may be set in accordance with the application.

In addition, in the chopping signal CH23, the fixed value at the start of the low-power brake control and the fixed value at the start of the high-power brake control are set to the same value. However, the fixed values of the effective braking force (duty factor) may be set independently; for example, the duty factor at the start of the high-power brake control may be set to 10/16 and the duty factor at the start of the low-power brake control may be set to 6/16.

Figure 16:
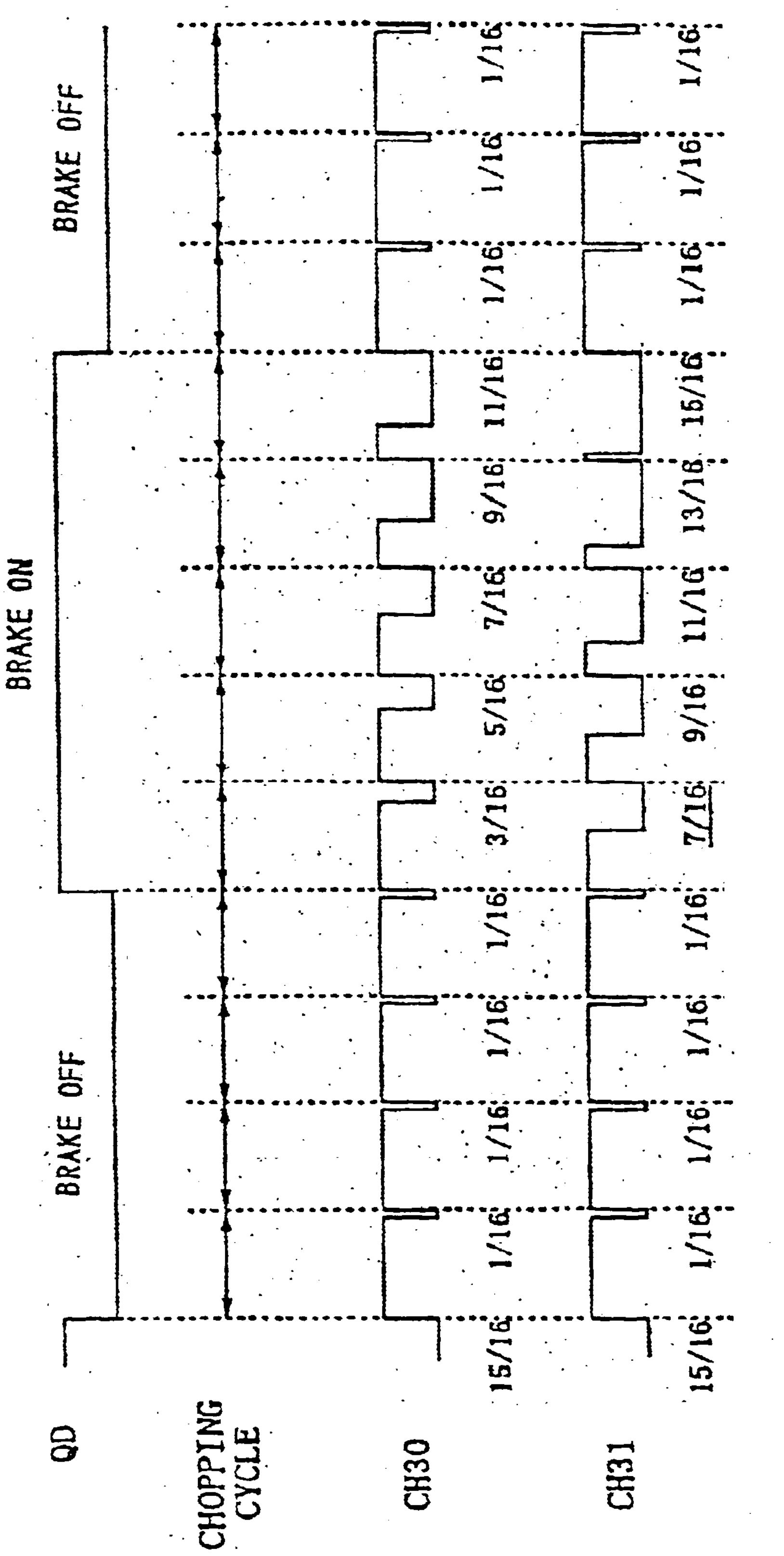
FIG. 16 is a timing chart showing the manner in which output signals from the brake generator change according to still another modification of the present invention.

In addition, in the second and third embodiments, the duty factor of the chopping signal, that is, the effective braking force, is gradually changed in both the high-power brake control and the low-power brake control. However, as a chopping signal CH30 shown in FIG. 16, the effective braking force may be increased only in the high-power brake control and be fixed in the low-power brake control. In addition, the effective braking force may be reduced only in the low-power brake control and be fixed in the high-power brake control.

In addition, as a chopping signal CH31, the initial effective braking force from which it is changed may be fixed.

In such a case, when the effective braking force is gradually increased in the high-power brake control, the generator 20 can be prevented from stopping due to a sudden increase of the braking force.

In addition, the duty factors of the chopping signals generated by the chopping signal generator 150 are not limited to 1/16, 8/16, and 15/16 as described in the first embodiment. For example, a chopping signal having a duty factor of 14/16, etc., may also be generated. In addition, the duty factors may also be set to 1/32, 31/32, etc.

When power generation is prioritized in the high-power brake control, a chopping signal of which the duty factor is in the range of 0.75 to 0.97 is preferably used. When the duty factor is in the range of 0.78 to 0.82, the charging voltage can be further increased, and when the duty factor is in the range of 0.90 to 0.97, the braking force can be further increased. The duty factor can be set in accordance with the application.

In the low-power brake control, the duty factor is preferably in the range of 0.01 to 0.30.

The duty factor of the chopping signal generated at the chopping signal generator 160 is not necessarily changed in sixteen steps. For example, the duty factor may also be changed in thirty-two steps. In the case in which the initial value when the brake control mode is switched is fixed, the fixed value may be determined in accordance with, for example, the variation in the duty factor.

Furthermore, although the effective braking force is changed by changing the duty factor of the chopping signal in the above-described embodiments, the effective braking force may be changed by changing the frequency.

For example, even when the duty factor is constant, the braking force can be reduced if the frequency of the chopping signal is increased to the range of, for example, 500 to 1100 Hz, and the charging voltage can be further increased. In addition, if the frequency is reduced to the range of, for example, 25 to 100 Hz, a large braking force can be applied.

Furthermore, the duty factor and the frequency of the chopping signal may both be changed in order to change the effective braking force.

In addition, it is not necessary to change the frequency and/or the duty factor of the chopping signal stepwise. The frequency and the duty factor of the chopping signal may also be continuously changed as in frequency modulation.

In addition, the method for changing the effective braking force is not limited to the above-described method in which the duty factor and/or the frequency of the chopping signal are changed. For example, the effective braking force may also be changed by attaching a variable resistor to a coil circuit to which the chopping signal is applied and changing the resistance at the time when the coil is shorted.

Although the 4-bit up/down counter 60 is used in the above-described embodiments, 3-bit or less, or 5-bit or more up/down counter may also be used. When an up/down counter with a large number of bits are used, a countable range is increased, so that the range in which the cumulative error can be corrected is also increased. In such a case, the generator 20 can be effectively controlled especially in a state immediately after the generator 20 is activated. When a up/down counter with a small number of bits are used, the range in which the cumulative error can be corrected is reduced. However, once the locked state is established, the count-up signal and the count-down signal are alternately input. Accordingly even a 1-bit counter can be used, and the cost can be reduced in such a case.

In addition, the brake control circuit 55 does not necessarily include the up/down counter. For example, the brake control circuit 55 may also be constructed of a first counting unit which counts the reference signal fs, a second counting unit which counts the rotation signal FG1, and a comparator which compares the counts obtained from the first and second counting units. However, the circuit construction can be made simpler when the up/down counter 60 is used. In addition, the rotation controller 50 may be constructed in accordance with the application as long as it can detect the rotational speed, etc., of the generator 20 and switch between the high-power brake control and the low-power brake control on the basis of the rotational speed.

In addition, the constructions of the rectifier 41, the brake circuit 120, the brake control circuit 55, the chopping signal generators 150 and 160, the brake generators 80, 170, and 180, etc., are not limited to the above-described embodiments, and may be determined in accordance with the application.

In the above-described embodiments, the brake generators 80, 170, and 180 are constructed of logic gates. However, they may also be constructed of switching elements which switch the outputs from the chopping signal generators 150 and 160, and ICs, etc., which are programmed such that the switching elements are controlled on the basis of the electromotive force of the generator, the braking force, etc.

In addition, the switches for connecting both ends of the generator 20 in the form of a closed loop are not limited to the switches 21 and 22, and any kinds of switches may be applied as long as the ends of the generator 20 can be connected in the form of a closed loop.

In addition, in the above-described embodiment, the rectifier 41 is constructed such that the chopper boost is utilized. However, the rectifier 41 may also include a booster circuit, etc., in which a voltage is boosted by changing connections of a plurality of capacitors. The rectifier 41 may be designed in accordance with the electronically-controlled, mechanical timepiece in which the generator and the rectifier is installed.

In addition, the brake circuit including the rectifier 41 is not limited to the brake circuit 120 of the above-described embodiments as long as the chopper control of the generator 20 can be performed. In addition, although the full wave is chopped in the above-described brake circuit 120, only half wave may also be chopped.

In addition, the frequency of the chopping signal in the above-described embodiments may be determined in accordance the application. When, for example, the frequency of the chopping signal is set to 50 Hz (that is, five times the rotational speed of the generator 20) or more, the braking efficiency can be increased while the charging voltage is maintained higher than a predetermined value. In addition, the duty factor of the chopping signal can also be determined in the range of 0.05 to 0.97 in accordance with the application.

The rotational speed (reference signal) of the rotor 12 is not limited to 8 Hz used in the above-described embodiments, and can be also be 10 Hz, etc., in accordance with the application.

In addition, the present invention is not limited to electronically-controlled, mechanical timepieces, and can also be applied to various kinds of timepieces including watches, clocks, and portable timepieces, portable blood pressure gauges, mobile phones, personal handyphone systems (PHSs), pagers, pedometers, calculators, portable computers, electric notebooks, personal digital assistants (PDAs), portable radios, toys, music boxes, metronomes, electric shavers, etc. According to the present invention, since the rotational speed of the generator can be efficiently maintained constant and the amount of power generation can be maintained higher than a predetermined value, various kinds of electronic devices can be reliably operated for a long time. Although the present invention can be applied to electronic devices installed in a building, the present invention is more suitable for portable devices used outside since the mechanical energy source such as a mainspring, etc., is used and an external energy source is not necessary.

Furthermore, the mechanical energy source is not limited to the mainspring 1*a*, and an elastic band, a spring, a heavy bob, compressed air, etc., may also be used as the mechanical energy source in accordance with the application. Mechanical energy may be stored in the mechanical energy source by a manual winding operation or by utilizing an oscillating weight, a potential energy, a pressure change, a wind power, a wave power, a waterpower, a temperature difference, etc.

The energy transmitting device, which transmits mechanical energy obtained from the mechanical energy source such as the mainspring, etc., to the generator, is not limited to the gear train used in the above-described embodiments. The energy transmitting device may also be constructed of a friction gear, a belt (timing belt, etc.) and pulley, a chain and sprocket wheel, a rack and pinion, a cam, etc., and may be designed in accordance with the electronic device to which the present invention is applied.

In addition, the time display is not limited to the hands 13, 14, and 17, and a circular, an annular, or an arc-shaped member may also be used. A digital time display using a liquid crystal panel, etc., may also be used, and such a timepiece having a digital display can also be obtained within the scope of the present invention.

According to the above-described embodiments, the brake control circuit 55 is constructed of a hardware including the up/down counter 60, the flip-flops, the logic elements, etc. However, the brake controller according to the present invention may also be constructed by disposing a computer having a central processing unit (CPU), a memory, etc., in an electronic device and installing a program that allows the above-described brake control in the computer.

For example, a CPU and a memory are installed in en electronic device such as a timepiece, etc., so that they can serve as a computer, and a control program is installed in the memory via a communication network such as the internet or from a storage medium such as a CD-ROM, a memory card, etc. The CPU is operated on the basis of the program that is installed in the memory, and the functions of the brake control circuit 55 are realized.

In order to install the predetermined program to an electronic device such as a timepiece, etc., a memory card, a CD-ROM, etc., may be directly inserted therein, or a device for reading information from such storage media may be externally attached to the electronic device. Alternatively, the program may also be obtained via LAN cables, telephone lines, or wireless communication, and then installed in the memory.

When the control program according to the present invention is provided, by means of storage media or via communication networks such as the Internet, and is installed in an electronic device, the above-described brake control can be performed in accordance with the characteristics of individual devices. Accordingly, the rotation control of various electronic devices can be individually performed with high reliability.

The above-described control program, which may be provided by means of storage media or via communication networks, is used on an electronic device including a mechanical energy source; a generator which is driven by the mechanical energy source, generates induced electrical power, and provides electrical energy; and a rotation controller which is driven by the generator, and which controls the rotation period of the generator. The rotation controller includes a switch which is able to connect both ends of the generator in the form of a closed loop; a chopping signal generator which generates a chopping signal applied to the switch for a brake control; and a brake controller. The above-described program may be constructed such that the program operates the brake controller such that the brake controller performs chopper control of the generator by switching over at least three brake control modes including a high-power brake control in which an effective braking force generated by applying the chopping signal is large, a mid-power brake control in which the effective braking force is smaller than the high-power brake control, and a low-power brake control in which the effective braking force is smaller than the mid-power brake control. Alternatively, the above-described program may also be constructed such that the program operates the brake controller such that the brake controller performs chopper control of the generator by switching between a high-power brake control in which an effective braking force generated by applying the chopping signal is gradually increased and a low-power brake control in which the effective braking force is gradually reduced. Alternatively, the above-described program may also b constructed such that the program operates the brake controller such that the brake controller performs chopper control of the generator by switching over at least two brake control modes including a high-power brake control in which an effective braking force generated by applying the chopping signal is large and a low-power brake control in which the effective braking force is smaller than the mid-power brake control, and which gradually changes the braking force in at least one of the high-power brake control and the low-power brake control.

As described above, according to the present invention, the braking torque can be increased while the reduction in power generation is suppressed, the variation in rotational speed of the rotor of the generator can be reduced, and the rotational speed can be reliably controlled while the rotor is prevented from stopping or rotating at an excessive speed.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. An electronic device, comprising:

a mechanical energy source;

a generator having two terminals, and configured to be driven by the mechanical energy source, to generate induced electrical power, and to provide electrical energy; and a rotation controller configured to be driven by the electrical energy, and to control a rotation period of the generator, the rotation controller including a switch that is able to selectively connect the terminals of the generator in the form of a closed loop, a chopping signal generator configured to generate a chopping signal that is applied to the switch for brake control of the generator, and a brake controller configured to control the chopping signal generator, and thereby control a braking force applied to the generator, by selectively switching between at least three brake control modes, including a high-power brake control mode in which an effective braking force is large, a mid-power brake control mode in which the effective braking force is less than the effective braking force of the high-power brake control mode, and a low-power brake control mode in which the effective braking force is less than the effective braking force of the mid-power brake control;

wherein the mid-power brake control mode is performed in a first transitional period during which the low-power brake control mode is switched to the high-power brake control mode, or in a second transitional period during which the high-power brake control mode is switched to the low-power brake control mode, or in both the first and second transitional periods.

2. An electronic device according to claim 1, wherein:

the chopping signal generator is configured to generate at least three chopping signals, each having a different duty factor or a different frequency than the others, to generate different effective braking forces depending on which chopping signal is applied to the switch, and the brake controller includes a chopping signal selector configured to select one of the at least three chopping signals to be applied to the switch.

3. An electronic device according to claim 1, wherein, in switching from the high-power brake control mode to the low-power brake control mode the applied braking force is gradually reduced, and, in switching from the low-power brake control mode to the high-power brake control mode the applied braking force is gradually increased.

4. An electronic device according to claim 3, wherein, when the low-power brake control mode is switched to the high-power brake control mode, the effective braking force is gradually increased from a predetermined value.

5. An electronic device according to claim 3, wherein, when the high-power brake control mode is switched to the low-power brake control mode, the effective braking force is gradually reduced from a predetermined value.

6. An electronic device according to claim 4, wherein the predetermined value is based on the effective braking force which is applied immediately before the brake control mode is switched.

7. An electronic device according to claim 5, wherein the predetermined value is based on the effective braking force which is applied immediately before the brake control mode is switched.

8. An electronically-controlled, mechanical timepiece, comprising:

a mechanical energy source;

a generator having two terminals, and configured to be driven by the mechanical energy source, to generate induced electrical power, and to provide electrical energy;

a time display configured to be operated in association with the rotation of the generator; and a rotation controller configured to be driven by the electrical energy, and to control the rotation period of the generator, the rotation controller including a switch that is able to selectively connect the terminals of the generator in the form of a closed loop, a chopping signal generator configured to generate a chopping signal that is applied to the switch for brake control of the generator, and a brake controller configured to control the chopping signal generator, and thereby control a braking force applied to the generator, by selectively switching between at least three brake control modes, including a high-power brake control mode in which an effective braking force is large, a mid-power brake control mode in which the effective braking force is less than the effective braking force of the high-power brake control, and a low-power brake control mode in which the effective braking force is less than the effective braking force of the mid-power brake control mode;

wherein the mid-power brake control mode is performed in a first transitional period during which the low-power brake control mode is switched to the high-power brake control mode, or in a second transitional period during which the high-power brake control mode is switched to the low-power brake control mode, or in both the first and second transitional periods.

9. An electronic device according to claim 8, wherein:

the chopping signal generator is configured to generate at least three chopping signals, each having a different duty factor or a different frequency than the others, to generate different effective braking forces depending on which chopping signal is applied to the switch, and the brake controller includes a chopping signal selector configured to select one of the at least three chopping signals to be applied to the switch.

10. An electronic device according to claim 8, wherein, in switching from the high-power brake control mode to the low-power brake control mode the applied braking force is gradually reduced, and, in switching from the low-power brake control mode to the high-power brake control mode the applied braking force is gradually increased.

11. An electronic device according to claim 10, wherein, when the low-power brake control mode is switched to the high-power brake control mode, the effective braking force is gradually increased from a predetermined value.

12. An electronic device according to claim 10, wherein, when the high-power brake control mode is switched to the low-power brake control mode, the effective braking force is gradually reduced from a predetermined value.

13. An electronic device according to claim 11, wherein the predetermined value is based on the effective braking force which is applied immediately before the brake control mode is switched.

14. An electronic device according to claim 12, wherein the predetermined value is based on the effective braking force which is applied immediately before the brake control mode is switched.

15. A method for controlling an electronic device which includes a mechanical energy source; a generator having two terminals, and configured to be driven by the mechanical energy source, to generate induced electrical power, and to provide electrical energy; and a rotation controller configured to be driven by the electrical energy and to control a rotation period of the generator, the method comprising the steps of:

applying a chopping signal to a switch that is able to selectively connect the terminals of the generator in the form of a loop; and controlling the applying of the chopping signal, and thereby controlling a braking force applied to the generator, by selectively switching between at least three brake control modes, including a high-power brake control mode in which an effective braking force is large, a mid-power brake control mode in which the effective braking force is less than the effective braking force of the high-power brake control mode, and a low-power brake control mode in which the effective braking force is less than the effective braking force of the mid-power brake control mode;

wherein the mid-power brake control mode is performed in a first transitional period during which the low-power brake control mode is switched to the high-power brake control mode, or in a second transitional period during which the high-power brake control mode is switched to the low-power brake control mode, or in both the first and second transitional periods.

* * * * *